US012711799B1

(12) United States Patent
Stewart et al.

(10) Patent No.: US 12,711,799 B1
(45) Date of Patent: Aug. 18, 2026

(54) SYSTEMS AND METHODS FOR IDENTIFYING DUPLICATE DOCUMENTS AND DETECTING MISREPRESENTATION

(71) Applicant: The PNC Financial Services Group, Inc., Pittsburgh, PA (US)

(72) Inventors: Joshua Raymond Stewart, Pittsburgh, PA (US); John Glenn Wilkinson, III, Pittsburgh, PA (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 46 days.

(21) Appl. No.: 18/884,595

(22) Filed: Sep. 13, 2024

Related U.S. Application Data

(60) Provisional application No. 63/645,480, filed on May 10, 2024.

(51) Int. Cl.
*G06V 30/418* (2022.01)
*B42D 25/20* (2014.01)
*G06V 30/19* (2022.01)

(52) U.S. Cl.
CPC .......... *G06V 30/418* (2022.01); *B42D 25/20* (2014.10); *G06V 30/19093* (2022.01)

(58) Field of Classification Search
CPC . G06V 30/418; G06V 30/19093; B42D 25/20
See application file for complete search history.

(56) References Cited

U.S. PATENT DOCUMENTS

| | | | | |
|---|---|---|---|---|
| 8,533,194 | B1 * | 9/2013 | Ravid | G06N 20/10 707/736 |
| 12,008,332 | B1 * | 6/2024 | Gardner | G06F 40/56 |
| 12,175,354 | B1 * | 12/2024 | Dehghanpoor | G06N 3/084 |
| 12,417,649 | B2 * | 9/2025 | Berestovsky | G06V 30/1448 |
| 2012/0209853 | A1 * | 8/2012 | Desai | G06F 16/3344 707/E17.014 |
| 2016/0062954 | A1 * | 3/2016 | Ruff | G06F 40/205 715/249 |
| 2019/0361760 | A1 * | 11/2019 | Krishnan | G06F 11/076 |
| 2020/0201895 | A1 * | 6/2020 | Sims | G06F 16/93 |
| 2021/0326652 | A1 * | 10/2021 | Hazard | G06N 5/045 |

(Continued)

*Primary Examiner* — Angelica Ruiz
(74) *Attorney, Agent, or Firm* — FINNEGAN, HENDERSON, FARABOW, GARRETT & DUNNER, LLP

(57) ABSTRACT

Systems, methods, and non-transitory computer readable media configured for identifying duplicate and misrepresented documents are provided. At least one processor may retrieve, from a first source, a first document, and may retrieve, from a second source, a second document. The processor may process each document. The processor may determine a cosine similarity between a first set of numbers and second set of numbers, and whether the cosine similarity exceeds a first threshold. The processor may determine a number of words in common between the two documents, and whether the number of words in common exceeds a second threshold. The processor may determine a number of sentences in common between the two documents, and whether that number exceeds a third threshold. Responsive to a determination that the first threshold, second threshold, or third threshold are exceeded, the processor may set a flag indicating that the second document is a duplicate.

20 Claims, 11 Drawing Sheets

(56) References Cited

U.S. PATENT DOCUMENTS

2023/0297458 A1* 9/2023 Hosudurg ........... G06F 11/0709
714/48
2023/0409615 A1* 12/2023 Khemka ................ G06V 20/68
2023/0418793 A1* 12/2023 Urdiales ............... G06F 16/215
2024/0143918 A1* 5/2024 Butler ................... G06F 40/211
2025/0029417 A1* 1/2025 Balasubramaniyan ......................
G06V 30/413

* cited by examiner

SYSTEMS AND METHODS FOR IDENTIFYING DUPLICATE DOCUMENTS AND DETECTING MISREPRESENTATION

CROSS-REFERENCE TO RELATED APPLICATIONS

This application is based on and claims benefit of priority of U.S. Provisional Patent Application No. 63/645,480, filed May 10, 2024, the contents of which are incorporated herein in their entirety.

TECHNICAL FIELD

The present disclosure relates generally to systems and methods for detecting potential misrepresentation. More specifically, but without limitation, this disclosure relates to systems and methods for detecting suspect resumes submitted by potential job candidates.

BACKGROUND

Businesses have long focused on how to identify, deter, and remediate suspicious activity for their customers. As technologies change, bad actors seek new ways of obtaining confidential information from organizations, beyond that of customer data. One potential entry point is the employment process. While safeguards such as background checks and I-9 forms currently exist, there are not currently satisfactory ways to identify misleading applicants early on in the recruiting process.

What is needed is a way to identify applicant activity that requires further investigation. Accordingly, some embodiments of this disclosure are directed to extracting data from recently submitted resumes and to compare them to all historical resumes. Consistent with this disclosure, tools may verify whether the new resume is duplicative of another resume in the historical resume data repository not associated with the same application. Disclosed embodiments may also apply to potentially fake employers, schools, and IP addresses.

Relatedly, unscrupulous managers may provide subpar feedback to employees, which may be evidenced by duplicative or cursory performance evaluations. What is needed is a method of evaluating performance evaluation feedback to determine quality, which may allow for streamlined further review of particular performance evaluations.

SUMMARY

One aspect of the present disclosure is directed to a system that may include a memory storing instructions and at least one processor configured to execute the instructions to perform operations. Another aspect may be related to a method. Yet another aspect is directed to a non-transitory computer readable medium. In each aspect, processor operations may include retrieving, from a first source, a first document; retrieving, from a second source, a second document; processing the first document and the second document, wherein processing comprises cleaning, tokenizing, and vectorizing each of the first document and the second documents; determining a cosine similarity between a first set of numbers and a second set of numbers, the first set of numbers corresponding to one or more sentences in the first document and the second set of numbers corresponding to one or more sentences in the second document, wherein each number in the first set of numbers corresponds to a word in the first document and each number in the second set of numbers corresponds to a word in the second document; determining whether the cosine similarity exceeds a first threshold; determining, based on the cosine similarity, a number of words in common between the first document and the second documents; determining whether the number of words in common exceeds a second threshold; determining, based on the cosine similarity, a number of sentences in common between the first document and the second document; determining whether the number of sentences in common exceeds a third threshold; and responsive to a determination that the cosine similarity exceeds the first threshold, the number of words in common exceeds the second threshold, or the number of sentences in common exceeds the third threshold: setting a flag that indicates that the second document is a duplicate.

Another aspect of the present disclosure is directed to a system. The system may include a memory storing instructions and at least one processor configured to execute the instructions to perform operations. The operations may include retrieving, from a first source, a first performance evaluation; retrieving, from a second source, a second performance evaluation; processing the first performance evaluation and the second performance evaluation, wherein processing comprises cleaning, tokenizing, and vectorizing each of the first performance evaluation and the second performance evaluation; determining a cosine similarity between a first set of numbers and a second set of numbers, the first set of numbers corresponding to one or more sentences in the first performance evaluation and the second set of numbers corresponding to one or more sentences in the second performance evaluation, wherein each number in the first set of numbers corresponds to a word in the first performance evaluation and each number in the second set of numbers corresponds to a word in the second performance evaluation; determining whether the cosine similarity exceeds a first threshold; determining a number of words in the second performance evaluation; determining whether the number of words in the second performance evaluation is below a second threshold; determining a performance review rating for the second performance evaluation; determining whether the performance review rating is below a third threshold; and responsive to a determination that the cosine similarity exceeds the first threshold, the number of words in the second performance review is below a second threshold, or the performance review rating is below the third threshold: setting a flag indicating that the second performance evaluation requires further review.

Yet another aspect of the present disclosure is directed to a system. The system may include a memory storing instructions and at least one processor configured to execute the instructions to perform operations. The operations may include retrieving, from a first source, a record of accredited universities; retrieving, from a second source, a record of suspect universities; retrieving, from a third source, a resume, wherein the resume recites one or more universities; processing the resume, wherein processing comprises cleaning, tokenizing, and vectorizing the resume; determining whether one or more universities recited on the resume matches one or more universities on the record of accredited universities; determining whether one or more universities recited on the resume matches one or more universities on the record of suspect universities; and responsive to a determination that one or more universities recited on the resume does not match one or more universities on the record of accredited universities, or that one or more universities recited on the resume matches one or more universities on the record of suspect universities: setting a flag indicating that the resume potentially contains one or more misrepresentations.

Yet another aspect of the present disclosure is directed to a system. The system may include a memory storing instructions and at least one processor configured to execute the instructions to perform operations. The operations may include retrieving, from a first source, a first resume; retrieving, from a second source, a second resume; processing the first resume and the second resume, wherein processing comprises cleaning, tokenizing, and vectorizing each of the first resume and the second resume; extracting a first set of metadata from the first resume, wherein the first set of metadata comprises a first IP address from which the first resume was submitted and a first timestamp from when the first resume was submitted; extracting a second set of metadata from the second resume, wherein the second set of metadata comprises a second IP address from which the second resume was submitted and a second timestamp from when the second resume was submitted; determining a cosine similarity between a first set of numbers and a second set of numbers, the first set of numbers corresponding to the first IP address and the second set of numbers corresponding to the second IP address; determining whether the cosine similarity is 1; detecting a gap between the first timestamp and the second timestamp; determining whether the gap is below a threshold; and responsive to a determination that the cosine similarity is 1 or the gap in the timestamps is below the threshold: setting a flag indicating that the second resume potentially contains one or more misrepresentations.

Yet another aspect of the present disclosure is directed to a system. The system may include a memory storing instructions and at least one processor configured to execute the instructions to perform operations. The operations may include retrieving, from a first source, a first resume; retrieving, from a second source, a second resume, wherein the second resume recites one or more universities; retrieving, from a third source, a record of accredited universities; retrieving, from a fourth source, a record of suspect universities; processing the first and second resumes, wherein processing comprises cleaning, tokenizing, and vectorizing each of the first and second resumes; extracting a first set of metadata from the first resume, wherein the first set of metadata comprises a first IP address from which the first resume was submitted and a first timestamp from when the first resume was submitted; extracting a second set of metadata from the second resume, wherein the second set of metadata comprises a second IP address from which the second resume was submitted and a second timestamp from when the second resume was submitted; determining a general cosine similarity between a first set of numbers and a second set of numbers, the first set of numbers corresponding to one or more sentences in the first resume and the second set of numbers corresponding to one or more sentences in the second resume; determining an IP address cosine similarity between a first set of numbers and a second set of numbers, the first set of numbers corresponding to the first IP address and the second set of numbers corresponding to the second IP address; determining whether one or more universities recited on the resume matches one or more universities on the record of accredited universities; determining whether one or more universities recited on the resume matches one or more universities on the record of suspect universities; determining whether the general cosine similarity exceeds a first threshold; determining, based on the general cosine similarity, a number of words in common between the first resume and the second resume; determining whether the number of words in common exceeds a second threshold; determining, based on the general cosine similarity, a number of sentences in common between the first resume and the second resume; determining whether the number of sentences in common exceeds a third threshold; determining whether the IP address cosine similarity is 1; determining a gap between the first timestamp and the second timestamp; determining whether the gap is below a fourth threshold; and responsive to a determination that: the general cosine similarity exceeds the first threshold, the number of words in common exceeds the second threshold, the number of sentences in common exceeds the third threshold, the IP address cosine similarity is 1, one or more of the universities recited on the second resume does not match one or more universities on the record of accredited universities, one or more of the universities recited on the second resume matches one or more universities recorded on the record of suspect universities, or the gap is below the fourth threshold: setting a flag that indicates that the second resume potentially contains one or more misrepresentations.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

Figure 1:
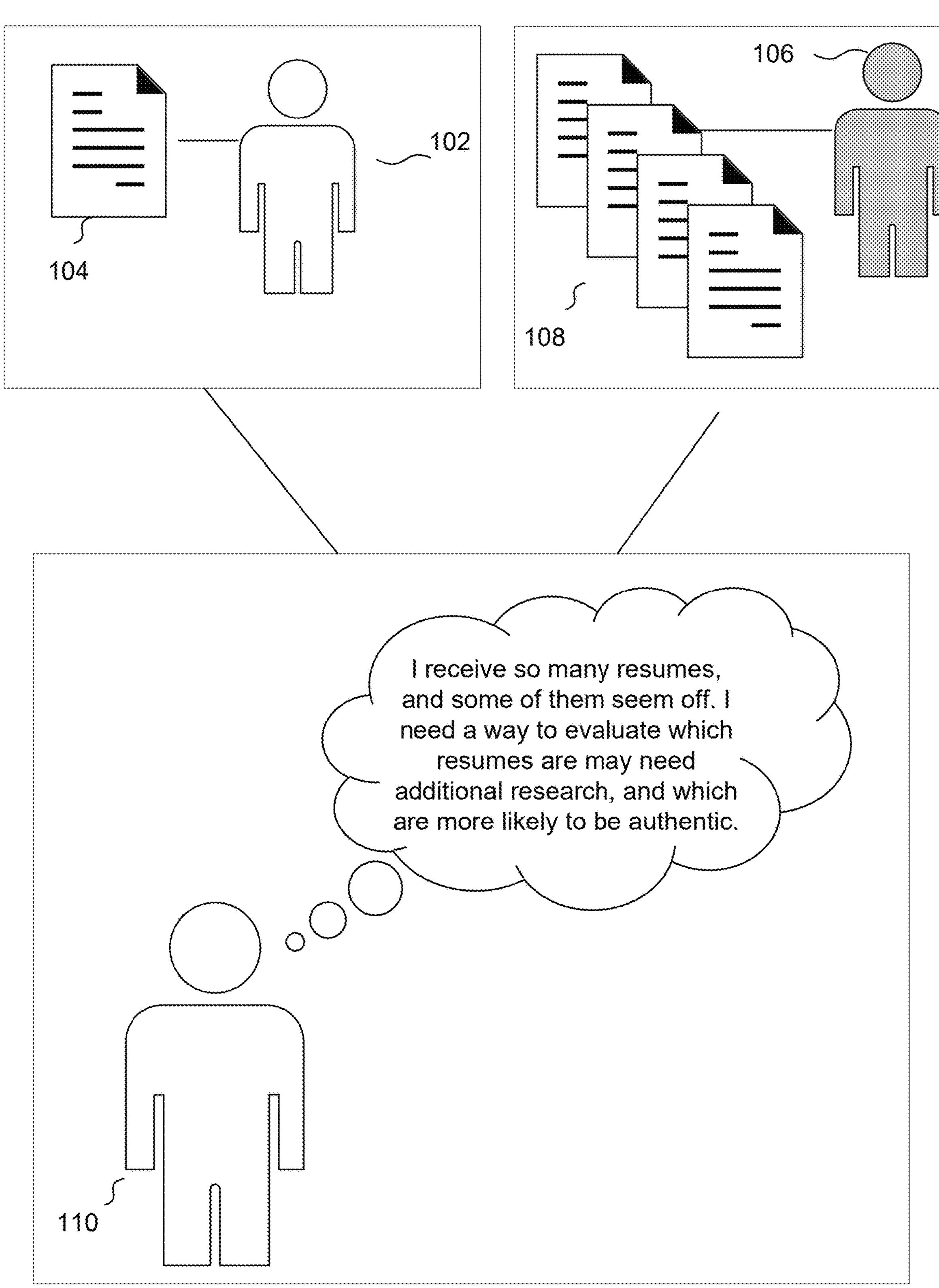
FIG. 1 illustrates an exemplary solution for identifying resumes that potentially contain misrepresented information, consistent with disclosed embodiments.

By way of example, FIG. 1 illustrates an exemplary solution for identifying resumes that potentially contain one or misrepresentations, consistent with disclosed embodiments. A misrepresentation refers to any false or misleading information, statement, or omission on a document made with the intent to deceive a reader and/or reviewer. Applicant 102 may apply to a job by submitting their resume 104 to a job portal. In this example, applicant 102 may apply to the job in good faith, and truthfully state their credentials on their resume 104. However, there may be bad actors 106 who submit fake resumes and other employment documents to learn confidential information about an organization. In this example, bad actor 106 may submit multiple resumes 108, and/or may include fake or suspicious information on at least one of the resumes 108. For example, bad actor 106 may submit a resume using fake or suspicious credentials, a fake or suspicious university, or may submit a burst of resumes from the same IP address. Employer 110 may receive an overwhelming number of resumes, most of which may be from good faith applicants similar to applicant 102, but some resumes may be submitted by bad actor 106. Consistent with disclosed embodiments, this disclosure presents systems, methods, and non-transitory computer readable media for identifying documents that potentially contain one or more misrepresentations.

Figure 2:
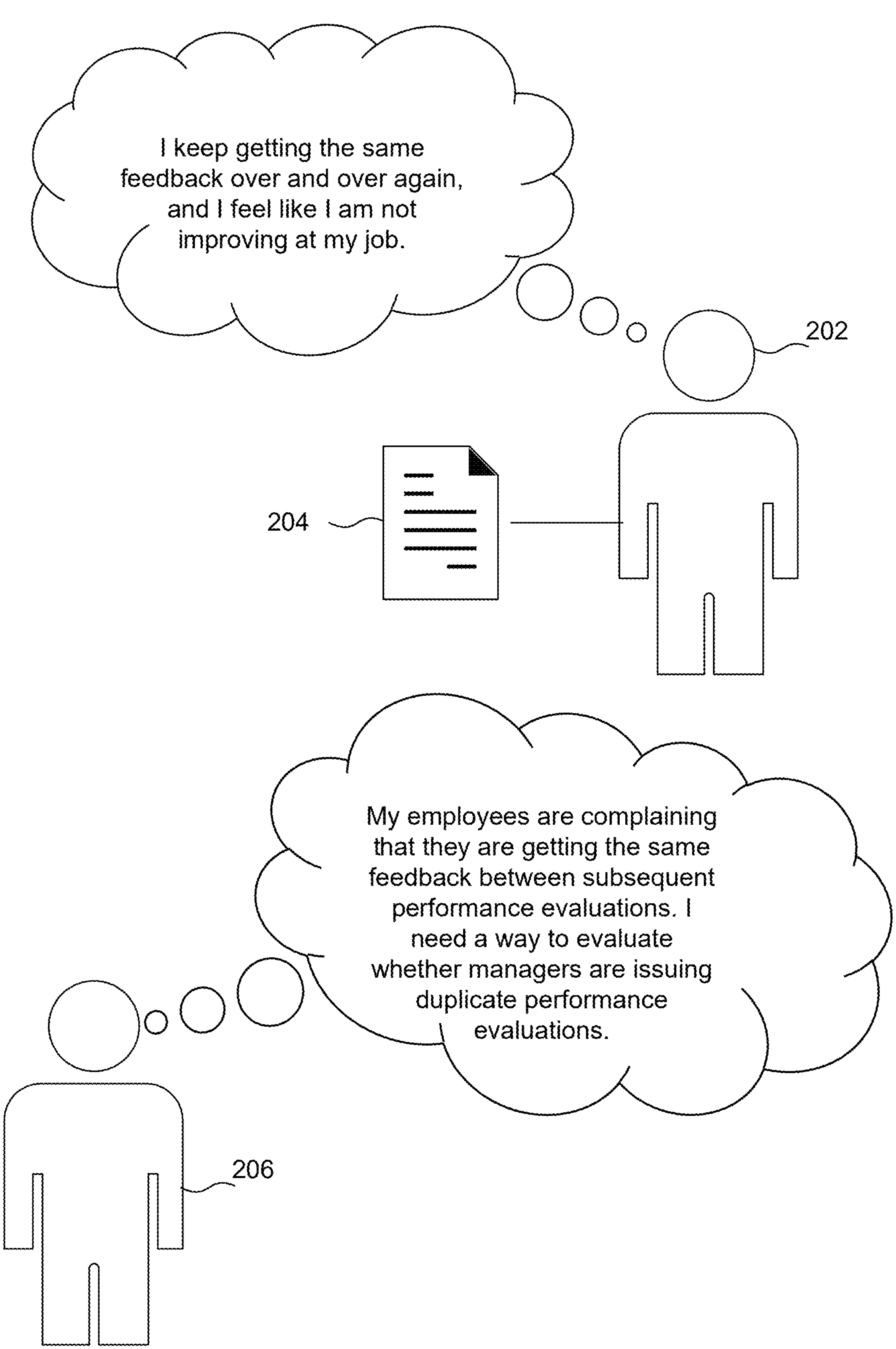
FIG. 2 illustrates an exemplary solution for identifying duplicate performance reviews, consistent with disclosed embodiments.

By way of example, FIG. 2 illustrates an exemplary solution for identifying duplicate or otherwise deficient performance evaluations, consistent with disclosed embodiments. In this example, employee 202 may receive a performance evaluation 204. Employee 202 may receive multiple performance evaluations per year, or may receive a single performance evaluation per year. In this example, employee 202 receives an identical or near identical performance evaluation each review cycle, wherein each evaluation cycle spans across six months or a year. In other examples, multiple employees overseen by a single manager may receive similar or duplicative feedback, which may indicate a lack of serious consideration of the merits of each individual employee, as the employer may expect. Consistent with disclosed embodiments, this disclosure presents systems, methods, and non-transitory computer readable media for a manager 206 to identify potentially duplicate performance evaluations. Manager 206 may work in human resources (HR) and/or may oversee a manager responsible for providing performance evaluations.

Figure 3:
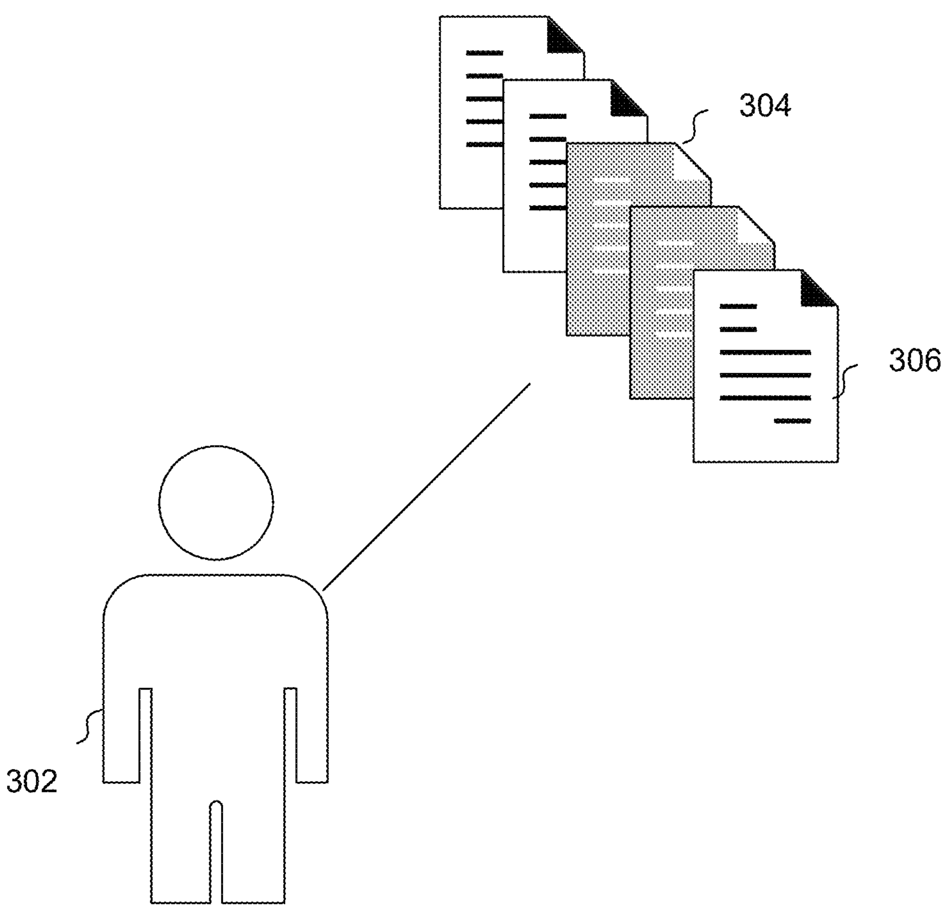
FIG. 3 illustrates an exemplary solution for identifying duplicate documents, consistent with disclosed embodiments.

By way of example, FIG. 3 illustrates an exemplary solution for identifying duplicate documents, consistent with disclosed embodiments. In this example, employer 302 is readily able to identify resumes and/or performance evaluations 304 that potentially contain one or more misrepresentations, and distinguish those resumes and/or performance evaluations 304 from resumes and/or performance evaluations 306 submitted by good faith actors, using embodiments consistent with the present disclosure. Here, employer 302 may separate the legitimate resumes from resumes potentially containing one or more misrepresentations, thereby streamlining the hiring process and ensuring that the employer's company does not inadvertently divulge confidential information to a bad actor 106.

Disclosed embodiments may involve systems, methods, and non-transitory computer readable medium configured to analyzing data retrieved from a plurality of documents. The computer readable medium may be a tangible device that can retain and store instructions for use by an instruction execution device. The computer readable medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via at least one processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications take place across two or more of these forms of networks and protocols. It is understood that in some embodiments, one or more aspects of the disclosed systems and methods may also be used in a localized system, with one or more of the components communicating directly with each other.

Figure 4:
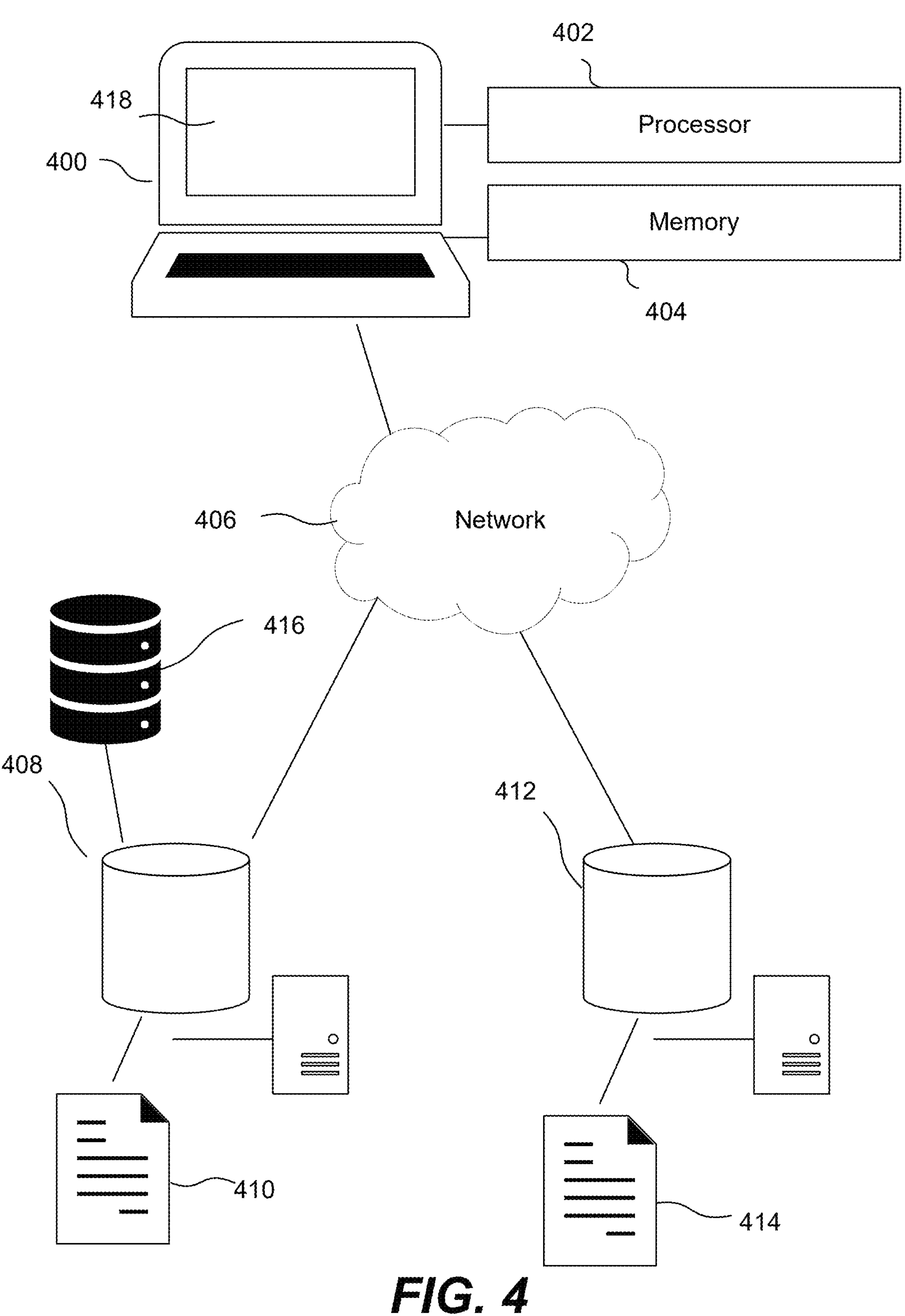
FIG. 4 is a schematic illustration of exemplary components used for identifying documents that are potentially duplicates and/or potentially contain one or more misrepresentations, consistent with disclosed embodiments.

In some embodiments, a system is disclosed. In some embodiments, the system comprises a memory storing instructions. By way of example, FIG. 4 is a schematic illustration of exemplary components used for identifying documents that are potentially duplicates and/or potentially contain one or more misrepresentations, consistent with disclosed embodiments. The disclosed system may comprise computing device 400, which may include at least one processor 402 and at least one memory 404. In a non-limiting example, computing device 400 may be a computer, smart phone, and/or tablet that an employer may access to review, analyze, and/or inspect documents.

In some embodiments, the system comprises at least one processor 402 configured to execute instructions. At least one processor 402 may include any physical device or group of devices having circuitry configured to perform one or more logic operations on an input or inputs. For example, at least one processor 402 may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. At least one processor 402 may take the form of, but is not limited to, a microprocessor, embedded processor, or the like, or may be integrated in a system on a chip (SoC). Furthermore, according to some embodiments, processor 402 may include one or more of the family of processors manufactured by Intel®, AMD®, Qualcomm®, Apple®, NVIDIA®, or the like. At least one processor 402 may also be based on the ARM architecture, a mobile processor, or a graphics processing unit, etc. The disclosed embodiments are not limited to any type of processor configured in the server. Computing device 400, containing at least one processor 402 and at least one memory 404, may be connected to a network 406, such as the Internet, a local area network, a wide area network and/or a wireless network.

Computing device 400 may comprise a memory 404, a processor 402, and/or other specialized hardware that is configured to execute one or more methods of the disclosed embodiments. Memory 404 may include one or more storage devices configured to store instructions used by at least one processor 402 to perform functions related to a server. The disclosed embodiments are not limited to particular software programs or devices configured to perform dedicated tasks. For example, the memory 404 may store a single program, such as a user-level application, that performs the functions associated with the disclosed embodiments, or may comprise multiple software programs. Additionally, at least one processor 402, in some embodiments, executes one or more programs (or portions thereof) remotely located from one or more servers. Furthermore, the memory 404 may include one or more storage devices configured to store data for use by the programs. The memory 404 may include, but is not limited to, a Random Access Memory (RAM), a Read-Only Memory (ROM), a hard drive, a solid state drive, an optical disk, other permanent, fixed, or volatile memory, a CD-ROM drive, a peripheral storage device (e.g., an external hard drive, a USB drive, etc.), a network drive, a cloud storage device, or any other mechanism capable of storing instructions. In some embodiments, each processor has a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, or by any other way that permits them to interact with each other.

In some embodiments, memory 404 includes a data repository. The data repository may be a database. The data repository may be coupled to a server. The data repository may be included on a volatile or non-volatile, magnetic, semiconductor, tape, optical, removable, non-removable, or other type of storage device or tangible or non-transitory computer-readable medium. The data repository may also be part of the server or separate from the server. When the data repository is not part of the server, the server may exchange data with the data repository via a communication link. The data repository may include one or more memory devices that store data and instructions used to perform one or more features of the disclosed embodiments. The data repository may include any suitable data repositories, ranging from small data repositories hosted on a workstation to large data repositories distributed among data centers. The data repository may also include any combination of one or more databases controlled by memory controller devices (e.g., server(s), etc.) or software. For example, the data repository may include document management systems, Microsoft SQL™ databases, SharePoint™ databases, Oracle™ databases, Sybase™ databases, other relational databases, or non-relational databases, such as mongo and others. In some embodiments, the server includes one or more input/output devices, communications devices, displays, and/or other interfaces (e.g., server-to-server, database to-to-database, or other network connections). The data repository may store account information, audit information, transaction information, asset identifier information, asset type information, user information, user history information, transaction history information, and other data.

In some embodiments, at least one processor 402 is configured to retrieve, from a first source, a first document. Retrieve may refer to at least one processor 402 performing a look-up and returning a document to perform additional tasks related to the document. A first source may refer to a data repository, remote physical server, cloud-based server, and/or any other storage medium. A first document may refer to a piece of written, printed, or electronic matter that includes certain information. Non-limiting examples of a first document may be a resume, a performance evaluation, and/or an email.

In some embodiments, the first source comprises a data repository of previously submitted documents. For example, previously submitted resumes may refer to resumes that one or more applicants have submitted over a previous 3-, 5-, or 10-year period that do or do not include resumes submitted within a most recent 24-hour period.

Computing device 400 may be connected to the first source 408 via network 406. First source 408 may be configured to store information, and may be a remote physical server, data repository, cloud server, and/or other storage medium. In this example, first source 408 contains a memory. In another example, first source 408 may be configured to communicate with a cloud server. First source 408 may be configured to store first documents 410. In this example, processor 402 may be configured to retrieve, from a first source, a first document. The first source may contain resumes submitted that one or more applicants have submitted over a previous 3-, 5-, or 10-year period, that do or do not include resumes submitted within a most recent 24-hour period. In this example, the first document may be an older resume, for example, a resume an applicant submitted two years previously.

In some embodiments, at least one processor 402 is configured to retrieve, from a second source, a second document. A second source may refer to a data repository, remote physical server, cloud-based server, and/or any other storage medium. In some embodiments, the second source comprises a data repository of newly submitted documents, including those that may have been submitted within the most recent 24-hour, one-day, or one-week period.

A second document may refer to a piece of written, printed, or electronic matter that includes certain information. Non-limiting examples of a first document may be a resume, a performance evaluation, and/or an email. In one example, the second source may be a data repository, and the second document may be a newly submitted resume. In some embodiments, a newly submitted resume refers to a resume that has been submitted within the past 24 hours. A newly submitted resume may also refer to a resume that has been submitted within the past seven days, or another period. The second source 412 may be a data repository storing newly submitted resumes.

Computing device 400 may be connected to the second source 412 via network 406. Second source 412 may be configured to store information, and may be a remote physical server, data repository, cloud server, and/or other storage medium. In this example, second source 412 contains a memory, similar to memory 404. Second source 412 may also communicate with a cloud server via network 406. Second source 412 may be configured to store second documents 414. In this example, processor 402 may be configured to retrieve, from second source 412, a second document 414. The second source may contain documents submitted within the past 24 hours, seven days, or one month. The second document may be a newly submitted resume or recently submitted performance evaluation. A recently submitted performance evaluation may refer to a performance evaluation that a manager submitted within the most recent evaluation cycle.

In some embodiments, at least one processor 402 is configured to process the first and second documents. Here, processing may refer to performing multiple operations on a document so that its information can be fed into a computer program.

Consistent with disclosed embodiments, processing comprises cleaning, tokenizing, and vectorizing each of the first and second documents. Cleaning may refer to removing, scrubbing, and/or extracting metadata and/or other hidden content from a document, such as personally identifiable information (PII), the document creation date, document modification date, and file size. Examples of PII may include a person's name, address, social security number, telephone number, email address, passport number, etc. In one example, all extracted metadata, including PII, may be stored in a data repository or database, such as HADOOP. In another example, non-PII metadata may be stored in one data repository, and PII metadata may be stored in another data repository. Hidden content may include hazardous code such as malicious scripts or malware that may be inadvertently associated with each of the first and second documents, which may present a privacy or security risk. Consistent with disclosed embodiments, processor 402 may be configured to use the extracted metadata to determine whether a second document potentially contains one or more misrepresentations. In a non-limiting example, processor 402 may be configured to extract text data from each of the first and second documents using natural language processing, optical character recognition, a KNN k-nearest neighbors (KNN) algorithm, and/or an Artificial Neural Network (ANN) algorithm. As described herein, a KNN algorithm may refer to a k-nearest neighbors algorithm, which is a non-parametric, supervised learning classifier, which uses proximity to make classifications or predications about the grouping of an individual data point. Here, the individual data points may be the characters in one or more documents that are processed. As described herein, an ANN algorithm refers to an Artificial Neural Network. ANNs are based on the principles of biological neural networks, and are made of up artificial neurons that work together to solve a problem. Here, an ANN may be used to analyze text information in a first and/or second document.

Tokenizing may refer to the process of substituting a sensitive data element, such as the applicant's name and address, with a non-sensitive equivalent, referred to as a token, that has no intrinsic or exploitable meaning or value. Tokenizing documents ensures that no PII is inadvertently associated with any document, and presents an advantage over encryption because tokenization does not rely on keys to modify the original data. The tokenized documents may be retained for later use without inadvertently exposing sensitive information. Processor 402 may be configured to tokenize each of the first and second documents to comply with relevant data privacy rules. Tokenization also further reduces the risk of a data breach. In one example, processor 402 may be configured to tokenize information by substituting individual characters or words, i.e., sensitive data elements, with non-sensitive equivalents, the tokens. In a non-limiting example, processor 402 may tokenize each of first and second documents using word tokenization, character tokenization, and/or subword tokenization.

Vectorizing may refer to the process of representing the unique characteristics of a document, such as document text, numerically such that a computer processor 402 may handle the unstructured text data. In one example, processor 402 may be configured to implement one or more techniques for vectorizing text, including but not limited to using a bag-of-words (BoW) model, a term frequency-inverse document frequency (TF-IDF) model, a paragraph vector model, and/or using one-hot encoding. In another example, processor 402 may be configured to retrieve compiled document data from a database such as HADOOP or ELASTICSEARCH, and convert the data to JSON in order to more easily handle the previously unstructured, complex document data. Processing may make it easier for the processor 402 to determine whether the first and second documents 410, 414 are duplicates or contain duplicate information, consistent with disclosed embodiments.

In one example, at least one processor 402 may clean first document 410. In this example, the first document may be a prior applicant's resume, submitted within the past five years. Processor 402 may remove personally identifying metadata from the resume, such as the resume's author name and address, as well as hidden data associated with the resume that may present a security risk. At least one processor 402 may, after cleaning the resume, extract the scrubbed metadata for future use. At least one processor 402 may also tokenize the resume. Tokenizing the resume may include converting a sequence of sensitive text, such as the applicant's name and/or address, into a non-sensitive equivalent, such as a string of numbers. Processor 402 may tokenize the resume using word tokenization, character tokenization, and/or subword tokenization. At least one processor 402 may be configured to vectorize the resume. Vectorizing may include converting the text of the resume into a set of numbers to be interpreted by at least one processor 402. Processor 402 may vectorize the resume using one or more techniques described herein, such as using a BoW model, a TF-IDF model, a paragraph vector, and/or one-hot encoding.

At least one processor 402 may be configured to load one or more batches of processed first documents 410, i.e., previously submitted documents, into vector repository 416. Vector repository 416 may be a database configured to accommodate a plurality of batches of processed and vectorized first documents 410, wherein each batch may comprise 100, 200, 500, or 1000 documents.

Computing device 400 may contain a graphical user interface (GUI) 418. In one example, at least one processor 402 may set 4 flags out of a batch of 100 newly submitted resumes. At least one processor 402 may be configured to provide for display number of set flags on GUI 418. Processor 402 may flag the newly submitted resumes by implementing a Python scripter to present the newly submitted resumes in a tabular format on GUI 418

Figure 5:
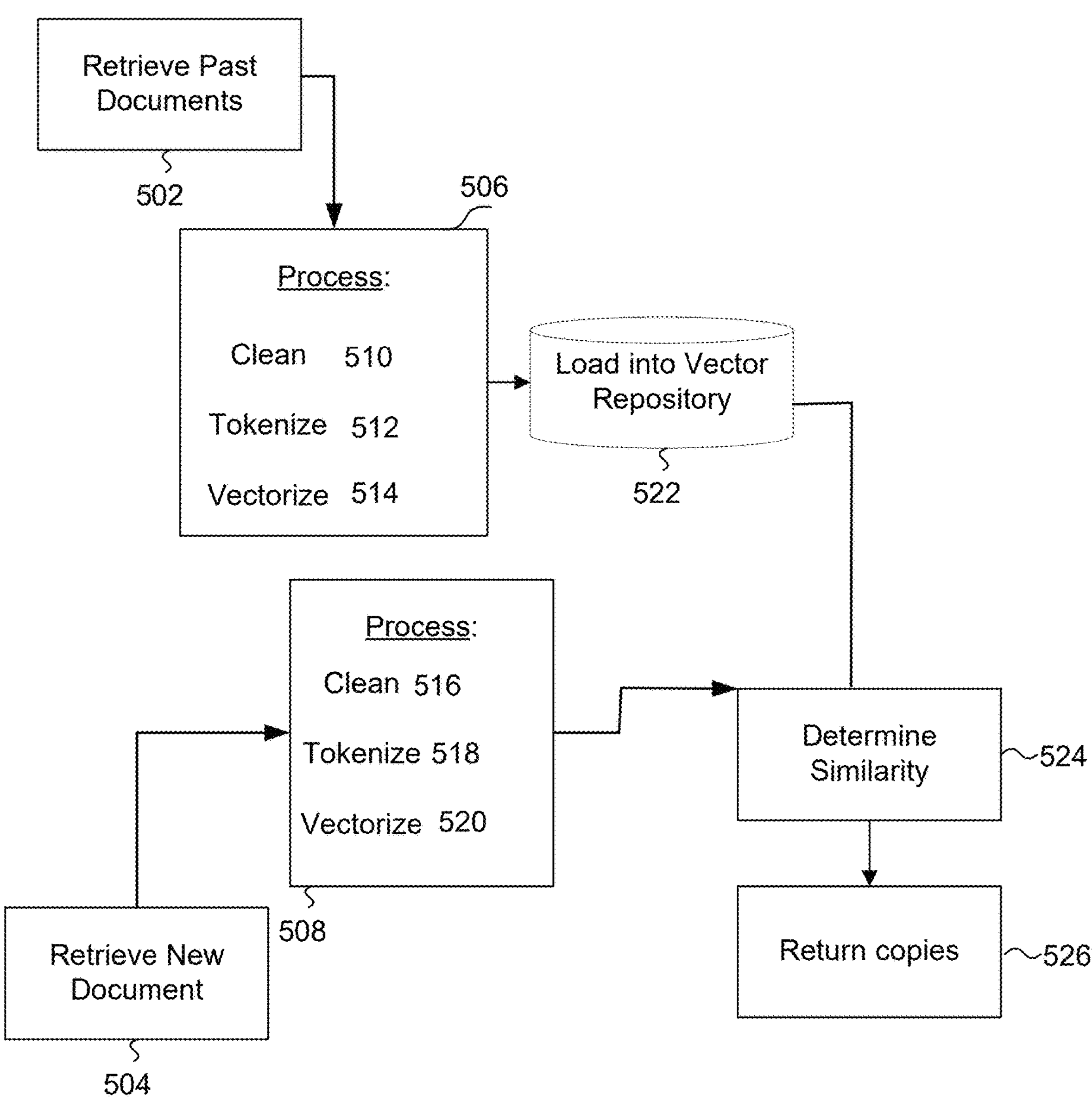
FIG. 5 illustrates a flow diagram of a method for identifying duplicate documents, consistent with disclosed embodiments.

By way of example, FIG. 5 illustrates a flow diagram of method 500 for identifying duplicate documents or significant duplication across documents, consistent with disclosed embodiments. At least one processor (such as, for example, processor 402 described in reference to FIG. 4) may perform the operations disclosed in method 500. At step 502, the processor may retrieve, from a first source (such as, for example, first source 408), a first document (such as, for example, first document 410). The first document may be a previously submitted resume, for example, a resume submitted within the previous five years. At step 504, the processor may be configured to retrieve, from a second source (such as, for example, second source 412), a second document (such as, for example, second document 414).

At least one processor may process the first document at step 506, and may process the second document at step 508. In this example, the first document is a previously submitted resume and the second document is a newly submitted resume. In one example, each of the first and second documents may be loaded into a database such as HADOOP or ELASTICSEARCH for further processing.

At step 510, at least one processor may clean a first document, i.e., remove or scrub personally identifying metadata or hazardous hidden data from the first document. At step 512, the processor may tokenize the first document. At step 514, the processor may vectorize the first document, i.e., the processor may convert the remaining text of the first document into a set of numbers to be more easily interpreted by the processor. At step 516, the processor may clean a second document. At step 518, the processor may tokenize the second document. At step 520, the processor may vectorize the second document. Consistent with disclosed embodiments, the processor may be configured to simultaneously perform steps 510 through 514 and steps 510 through 520.

At step 522, at least one processor may load a batch of processed first documents (such as, for example, first documents 410) from a first source (such as, for example, first source 408) to a vector repository (such as, for example, vector repository 416). The first documents may be a plurality of resumes. A batch of processed resumes may include 100, 200, 500, or 1000 previously submitted resumes, wherein the size of the batch may be configured by the employer.

At step 524, at least one processor may determine the similarity between the first document and the second document, as described elsewhere in this disclosure. At step 526, the processor may return copies for manual inspection, as described elsewhere in this disclosure.

Figure 6:
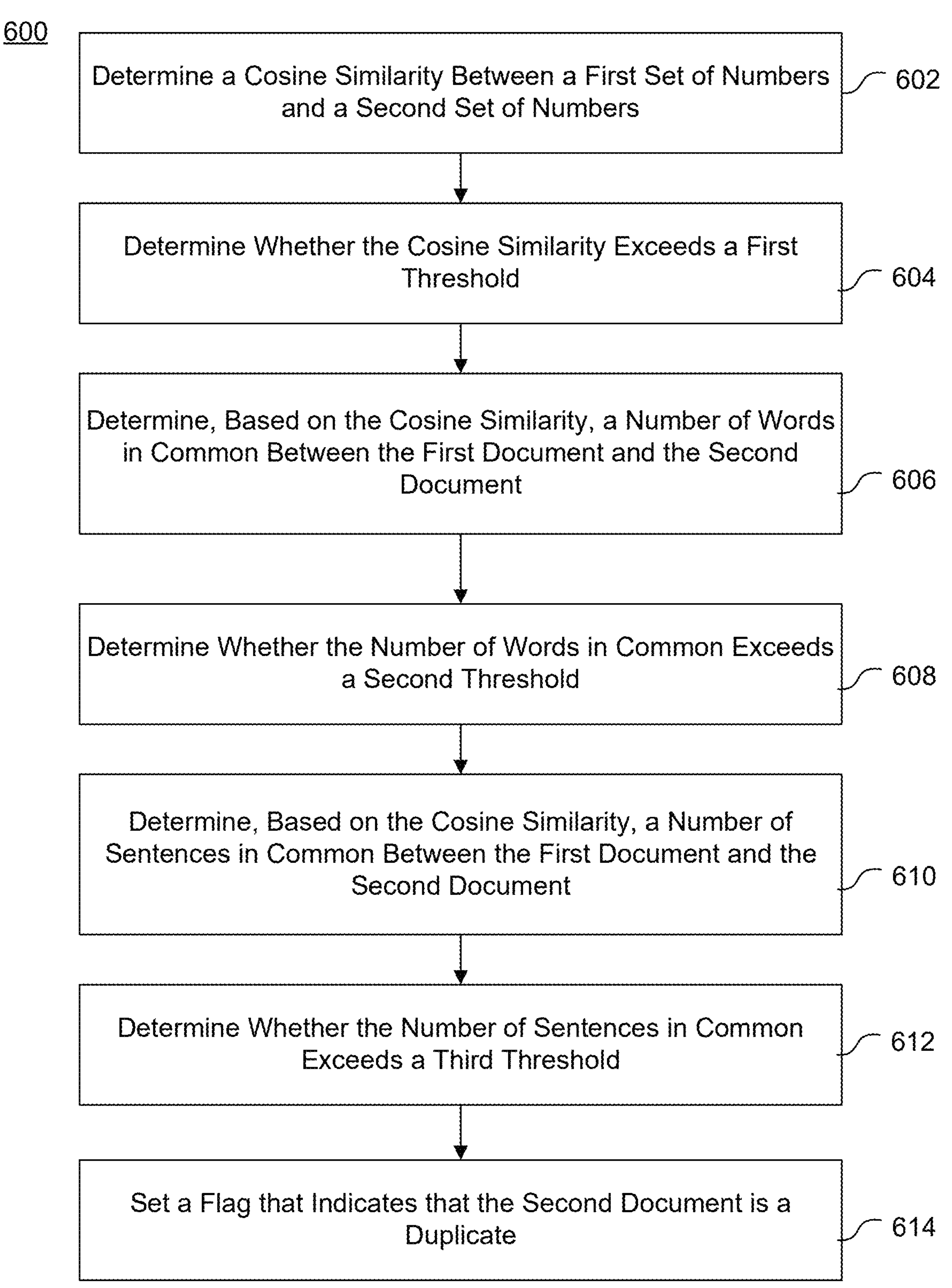
FIG. 6 is a flowchart illustrating an exemplary method for identifying duplicate documents, consistent with disclosed embodiments.

By way of example, FIG. 6 is a flowchart illustrating an exemplary method 600 of identifying duplicate documents, consistent with disclosed embodiments. In some embodiments, determining similarity as shown at step 524 in FIG. 5 may be performed as shown in the exemplary flowchart of FIG. 6. The operations described in reference to FIG. 6 may be performed by at least one processor, such as, for example, processor 402 described in reference to FIG. 4. In some embodiments, and referring to FIG. 6, at step 602, at least one processor is configured to determine a cosine similarity between a first set of numbers and a second set of numbers, the first set of numbers corresponding to one or more sentences in the first document and the second set of numbers corresponding to one or more sentences in the second document. The processor may calculate the cosine similarity based on the number of words in a document, the number of sentences in a document, and/or metadata associated with a document.

Cosine similarity may refer to a mathematical formula for measuring the similarity between two sequences of numbers, wherein the numbers are in a particular order. The general formula for cosine similarity is shown below as Formula 1.

General formula for cosine similarity. Formula 1

$$\cos\theta = \frac{\vec{a}\cdot\vec{b}}{\|\vec{a}\|\|\vec{b}\|}$$

$$\|\vec{a}\| = \sqrt{a_1^2 + a_2^2 + a_3^2 + \ldots + a_n^2}$$

$$\|\vec{b}\| = \sqrt{b_1^2 + b_2^2 + b_3^2 + \ldots + b_n^2}$$

The cosine similarity between two sequences of numbers may be between 0 and 1. If the two sequences of numbers are exactly the same, then the cosine similarity is 1. Conversely, if the two sequences of numbers share no similarities, the cosine similarity is 0. If the two sequences of numbers have some numbers in common, the cosine similarity is between 0 and 1.

For a cosine similarity calculation of specific words, words that are identical between the first and second documents are assigned a cosine similarity of 1, whereas words that differ between the first and second documents are assigned a cosine similarity of 0. In another example, sentences that are identical between the first and second documents are assigned a cosine similarity of 1, whereas sentences that differ between the first and second documents are assigned a cosine similarity of 0. A sentence that contains some words in common between the first and second documents is assigned a cosine similarity between 0 and 1.

For example, a sentence in the first document may read, "I like apples and oranges." A sentence in the second document may read, "I like strawberries and oranges." In this example, the two sentences are nearly identical, except that the first sentence contains the word "apples," whereas the second sentence contains the word "strawberries." Aggregating all six unique words between the two sentences, the cosine similarity would be 0.8, as shown in the table below.

TABLE 1

| | I | like | apples | and | oranges | strawberries |
|---|---|---|---|---|---|---|
| Text 1 | 1 | 1 | 1 | 1 | 1 | 0 |
| Text 2 | 1 | 1 | 0 | 1 | 1 | 1 |
| Cosine Similarity = 0.8 | | | | | | |

In some embodiments, and referring to FIG. 6, at least one processor (such as, for example, processor 402 described in reference to FIG. 4) is configured to execute instructions to determine whether the cosine similarity exceeds a first threshold at step 604. The first threshold may be the minimum cosine similarity that indicates that the first and second documents may be duplicates of one another. The processor may be configured to store the first threshold value in a memory (such as, for example, memory 404). The first threshold may be a set number, or the first threshold may be a range. In one example, the processor may be further configured to use one or more bits to store a binary "yes" or "no" value to signal whether the cosine similarity exceeds the first threshold. If the cosine similarity exceeds the first threshold, the processor may be configured to set a binary "yes" flag, indicating that the second document is a duplicate.

In the example in Table 1, each sentence contains five words, four of which are identical between the first sentence and the second sentence. Therefore, as explained in Table 1, the first and second sequences of numbers have a cosine similarity of 0.8.

In some embodiments, the first threshold is between 0.5 and 1. In some embodiments, the first threshold is 0.85. At least one processor (such as, for example, processor 402 described in reference to FIG. 4) may be configured to adjust the first threshold based on employer input. For example, the employer may initially set the first threshold at 0.7, but the processor may flag too many documents, such as a newly submitted resume, for the employer to review. Here, the employer may adjust the first threshold such that it is 0.8 or 0.9, which captures fewer documents and may ensure that a larger percentage of the captured documents share more duplicate information. The processor may be configured to store the updated first threshold value in a memory (such as, for example, memory 404).

In some embodiments, and referring to FIG. 6, at step 606, at least one processor is configured to determine, based on the cosine similarity, a number of words in common between the first and second documents. In one example, the processor may determine that the cosine similarity between the first and second documents is 0.5. This cosine similarity may indicate that the documents are somewhat similar to one another. The processor may be configured to determine how many words are on each of the first and second documents, based on the quantity of numbers in each of the first and second set of numbers. In this example, based on how many numbers are in each of the first and second set of numbers, and the cosine similarity between the first and second set of numbers, the processor may determine that the first and second documents contain 80 words in common. The processor may be configured to store the number of words in common in a memory (such as, for example, memory 404).

In some embodiments, and referring to FIG. 6, at step 608, at least one processor is configured to determine whether the number of words in common exceeds a second threshold. The second threshold may refer to the maximum permissible number of words in common between the first document (such as, for example, first document 410) and the second document (such as, for example, second document 414). In one example, the processor may be configured to use one or more bits to store a binary "yes" or "no" value to signal whether the number of words in common exceeds the second threshold. If the cosine similarity exceeds the second threshold, the processor may be configured to set a binary "yes" flag, indicating that the second document is a duplicate. In one example, the processor may determine that the first and second document contain 40 words in common. In another example, the processor may determine that the first and second documents contain 120 words in common. The processor may set the second threshold at 100 words. Accordingly, in the first example, the processor may determine that the number of words in common is below the second threshold and may not flag the second document for additional review. In the second example, however, the number of words in common between the first and second documents exceeds the second threshold. In that example, the processor may flag the second document for additional review by setting a binary "yes" flag, indicating that the second document is a duplicate.

At least one processor (such as, for example, processor 402) may flag the second document if the number of words in common between the first and second documents is exactly the second threshold. For example, a processor may set the second threshold at 100 words in common. In this example, the first and second document may contain 100 words in common. Here, the processor may flag the second document for additional review. In some embodiments, the second threshold is between 50 and 150. In some embodiments, the second threshold is 100. In one example, the processor may be configured to set and/or update the second threshold based on user input. For example, an employer may initially set the second threshold as 50, but may flag too many documents to review. Instead, the employer may adjust the second threshold to 100 words in common to reduce the time it takes to process the documents, increase the chances of capturing documents that potentially contain one or more misrepresentations, and to decrease the time necessary to manually review the flagged documents.

In some embodiments, and referring to FIG. 6, at step 610, at least one processor (such as, for example, processor 402) is configured to determine, based on the cosine similarity, a number of sentences in common between the first document and the second document. For example, the processor may determine that the cosine similarity between the first and second documents is 0.5. Based on the length of each document, a processor may determine that the first and second documents (such as, for example, first document 410 and second document 414) contain 4 sentences in common. A processor may group a plurality of words into sentences to determine the number of overlapping sentences. A processor may be configured to determine whether a plurality of words is a sentence by using, for example, natural language processing, optical character recognition, an ANN algorithm, and/or a KNN algorithm, as described elsewhere in this disclosure.

In some embodiments, and referring to FIG. 6, at step 612, at least one processor (such as, for example, processor 402) is configured to determine whether the number of sentences in common exceeds a third threshold. The processor may be configured to set and update the third threshold based on employer or manager input. Consistent with disclosed embodiments, the at least one processor may be configured to use one or more bits to store a binary "yes" or "no" value to signal whether the cosine similarity exceeds the first threshold. If the cosine similarity exceeds the first threshold, the at least one processor may be configured to set a binary "yes" flag, indicating that the second document is a duplicate.

The lower the third threshold, the more documents that the processor may flag as a duplicate, and vice versa. The third threshold may be a range of numbers or the third threshold may be a single number. In some embodiments, the third threshold is between 5 and 10. Specifically, the third threshold may be 6. In this example, the processor may determine that the first and second documents share 4 sentences in common, and that the number of sentences in common does not exceed the third threshold. In another example, the processor may determine that the first and second documents share 7 sentences in common. Here, the processor may determine that the number of sentences in common exceeds the third threshold. The processor may also set a flag if the number of sentences in common is exactly the third threshold. In this example, the processor may determine that the first and second documents share 6 sentences in common. Here, the processor may determine that the number of sentences in common exactly meets the third threshold.

The first and second documents (such as, for example, first document 410 and second document 414) may each contain a plurality of sentences, each comprising a plurality of words. For example, a first resume may list an applicant's work experience in a plurality of bullets. A second resume may similarly list an applicant's work experience in a plurality of bullets. A processor (such as, for example, processor 402) may be configured to analyze and vectorize each bullet point to determine the cosine similarity between the two documents with respect to each applicant's work experience. The processor may analyze each document using, for example, natural language processing, optical character recognition, an ANN algorithm, and/or a KNN algorithm. In another example, each of the first and second documents is a resume, containing each applicant's name, address information, work experience, education, and/or other information. Consistent with disclosed embodiments, the processor may be configured to analyze all text in each document and determine a cosine similarity between the first and second documents. In one example, the processor may determine that a first and second document have a cosine similarity of 0.4. A cosine similarity of 0.4 may indicate that the two documents share some elements, but not enough elements to indicate that the two may be duplicates. In another embodiment, the processor may determine that the first and second documents have a cosine similarity of 0.9. A cosine similarity of 0.9 may indicate that the first and second documents are nearly identical, and the processor may flag the second document for manual inspection by an employer, manager, or both.

Consistent with disclosed embodiments, at least one processor (such as, for example, processor 402 as described in reference to FIG. 4) may be configured, when analyzing the first and second documents, to remove stop words. Stop words are words that are removed from natural language data before or after processing because they are considered insignificant. Non-limiting examples of stop words include "a," "of," "to," "and," "I," "also," and "like." The processor may be configured to remove stop words prior to vectorizing. Removing stop words from the processor's analysis may improve processing speed because it reduces the number of words that the processor must vectorize. Removing stop words may also improve accuracy by removing flags of documents as similar that simply share commonly used words.

In one example, each of the first and second documents (such as, for example, first document 410 and second document 414) are resumes. Here, at least one processor (such as, for example, processor 402) may be configured to detect whether the first and second resumes are from the same applicant applying to different jobs. The processor may detect whether applicants are applying to different jobs by identifying and locating the relevant information in the resume or in the metadata associated with the resume. In one example, the processor may be configured to extract this data from the resume. The metadata associated with the resume may be the candidate's name, candidate ID, and/or the job ID. A candidate ID and a job ID may refer to identifiers that refer to a potential applicant and the job opening without using personally identifying information. The candidate ID and job ID may be generated by the employer. The processor may determine that the first and second resumes belong to the same person applying to different jobs based on the job ID associated with the resume.

In another example, at least one processor (such as, for example, processor 402 as described in reference to FIG. 4) may be configured to only determine the cosine similarity between the first and second documents if the processor initially determines that the cosine similarity is not 0. Initially determining may refer to the processor performing a portion of the cosine similarity analysis, but not the entire cosine similarity analysis. A final determination may refer to the processor completing the entire cosine similarity analysis, i.e., the processor analyzes and vectorizes 100% of the text included in the first and second documents. In an example where the processor only performs an initial cosine similarity analysis, the processor may analyze and vectorize the first 10%, 20%, or 25% of the document instead of the entire document. In this example, the processor may be configured to stop its analysis and move on to the document from the second source if its initial analysis indicates that the cosine similarity is 0, i.e., the documents are completely different. Stopping the analysis based on this initial indication saves processing time and costs and allows more documents to be processed in a shorter period of time.

In some embodiments, and referring to FIG. 6, at step 614, at least one processor (such as, for example, processor 402 as described in reference to FIG. 4) is configured to—responsive to a determination that the cosine similarity exceeds the first threshold, the number of words in common exceeds the second threshold, or the number of sentences in common exceeds the third threshold—set a flag that indicates that the second document is a duplicate. Setting a flag may refer to logging or otherwise storing in memory (such as, for example, memory 404) that one or more second documents are duplicates. As discussed herein, the processor may be configured to set a binary "yes" flag, indicating that the second document is a duplicate if the any of the above-listed conditions are met. In one example, the processor may store the set flag information in a memory associated with a computing device (such as, for example, computing device 400 as described in reference to FIG. 4). In another example, the processor may determine that the cosine similarity exceeds the first threshold, but that the other thresholds are not triggered. In this example, the processor may still flag the second document for further review.

In some embodiments, at least one processor (such as, for example, processor 402 as described in reference to FIG. 4) is further configured to iterate the processing, determining, and flag setting steps for each of a plurality of documents retrieved from the second source (such as, for example, second source 412), until the second source no longer contains any documents to process. For example, the processor may detect that the second source contains 50 newly submitted resumes, that is, 50 resumes that applicants submitted over a most recent 24-hour period. Here, the processor may be configured to perform the above processing, determining, and flag-setting steps for each of the 50 newly submitted resumes. In this example, the processor may flag 4 newly submitted resumes for further review.

Table 2 contains exemplary results from a processor (such as, for example, processor 402) iterating the above processing, determining, and flag setting steps.

TABLE 2

| Cosine Similarity | No Misrepresentations | Contains Misrepresentations |
|---|---|---|
| 0.80 | 9 | |
| 0.81 | 9 | |
| 0.82 | 7 | |
| 0.83 | 7 | |
| 0.84 | 2 | |
| 0.85 | 413 | 21 |
| 0.86 | 663 | 17 |
| 0.87 | 511 | 37 |
| 0.88 | 371 | 48 |
| 0.89 | 298 | 53 |
| 0.90 | 164 | 63 |
| 0.91 | 96 | 24 |
| 0.92 | 32 | 29 |
| 0.93 | 26 | 25 |
| 0.94 | 10 | 28 |
| 0.95 | 7 | 16 |
| 0.96 | | 2 |
| 0.97 | | 11 |
| 0.98 | | 9 |
| 0.99 | | 63 |
| 1.00 | | 7 |
| Grand Total | 2626 | 453 |

Table 2 breaks down documents potentially contain one or more misrepresentations based on the determined cosine similarity. The above example shows that as the cosine similarity increases, the chance that a second document contains misrepresentations and/or is a duplicate increases. In this example, the processor flagged each document for further review when the cosine similarity was above 0.8. In some embodiments, the number of set flags may be displayed on a GUI, such as, for example, GUI 418 as described in reference to FIG. 4.

In one example, at least one processor (such as, for example, processor 402) may be configured to filter out the number of set flags based on data associated with the newly submitted resumes. In this example, the processor may only flag newly submitted resumes with a certain candidate ID, job ID, and/or timestamp.

Figure 7:
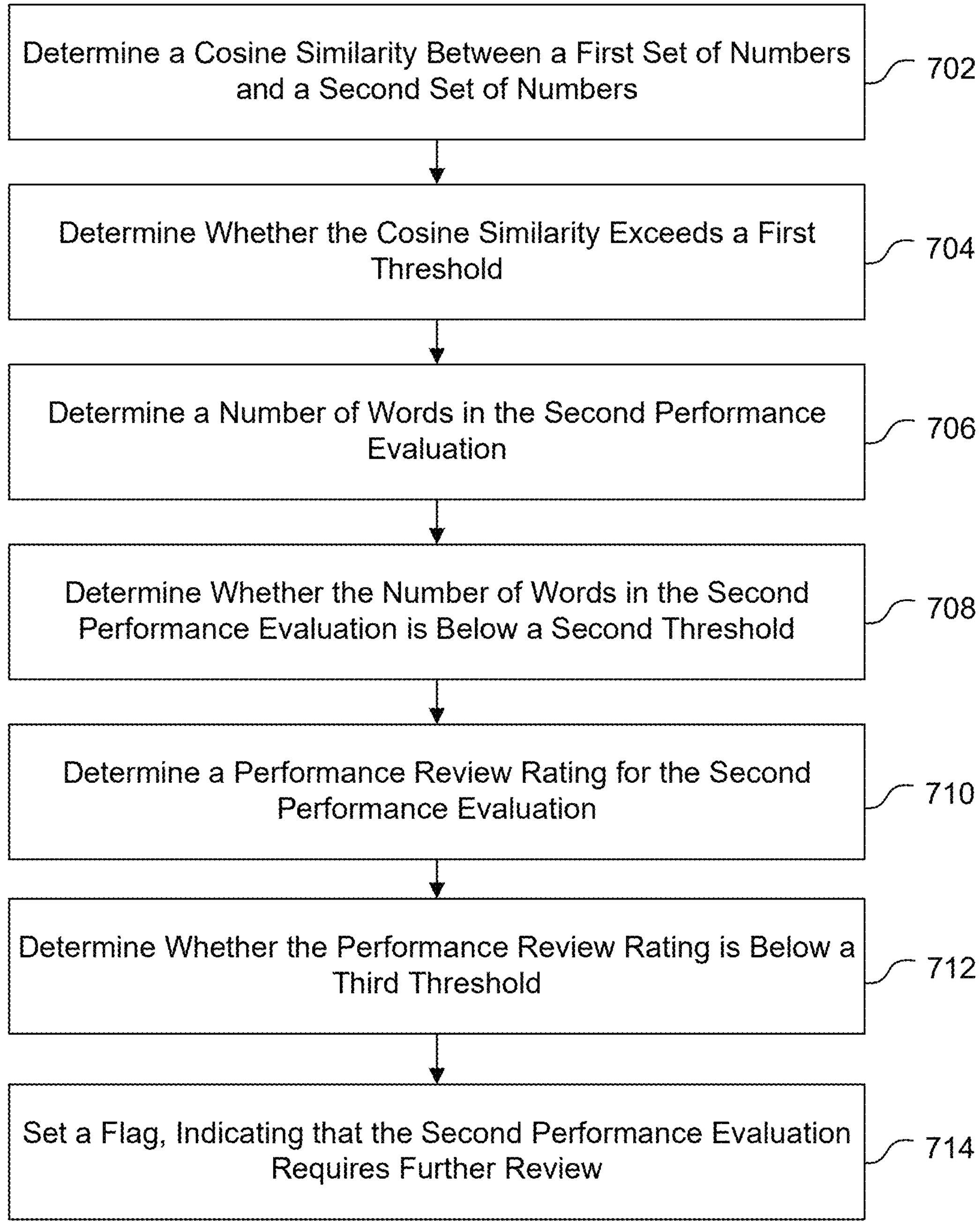
FIG. 7 is a flowchart illustrating an exemplary method for identifying potentially duplicate or deficient performance reviews, consistent with disclosed embodiments.

By way of example, FIG. 7 is a flowchart illustrating an exemplary method 700 for identifying potentially duplicate or deficient performance reviews, consistent with disclosed embodiments. FIG. 7 represents exemplary operations a processor (such as, for example, processor 402, described in reference to FIG. 4) may perform at step 524, as described in reference to FIG. 5. In this example, each of the first and second documents is a performance evaluation.

In some embodiments, and referring to FIG. 7, at step 702, at least one processor is configured to determine a cosine similarity between a first set of numbers and a second set of numbers, the first set of numbers corresponding to one or more sentences in a first performance evaluation and the second set of numbers corresponding to one or more sentences in a second performance evaluation, wherein each number in the first set of numbers corresponds to a word in the first performance evaluation and each number in the second set of numbers corresponds to a word in the second performance evaluation.

In some embodiments, and referring to FIG. 7, at step 704, at least one processor is configured to determine whether the cosine similarity exceeds a first threshold. The processor may be configured to set the first threshold based on user input or employer input. The first threshold may refer to the minimum value where the processor flags the second performance evaluation for further review. For example, the first threshold may be 0.5, 0.6, or 0.7. The processor may set the first threshold and may set a flag as described elsewhere in this disclosure.

In some embodiments, and referring to FIG. 7, at step 706, at least one processor is configured to determine a number of words in the second performance evaluation. The number of words in a performance evaluation may indicate how complete and/or thorough the performance evaluation is. Fewer words in a performance evaluation may indicate that the manager put minimal effort in the performance evaluation, whereas a more comprehensive performance evaluation may indicate more attention given to the performance evaluation.

In some embodiments, and referring to FIG. 7, at step 708, at least one processor is configured to determine whether the number of words in the second performance evaluation is below a second threshold. The employer and/or manager may set the second threshold. The processor may set the second threshold and may set a flag, as described elsewhere in this disclosure. In one example, the second threshold may be 50 words. In this example, the processor may determine that a performance evaluation only contains 25 words. This may indicate that the performance review requires further review.

In some embodiments, and referring to FIG. 7, at step 710, at least one processor is configured to determine a performance review rating for the second performance evaluation. The performance evaluation rating may refer to a scale that evaluates an employee's performance. In one example, the scale may be from 1 to 5. In this example, the processor may determine that an employee's rating was 2 out of 5. The processor may identify the employee's performance rating by analyzing and extracting data associated with the performance evaluation, for example, by using natural language processing, optical character recognition, an ANN algorithm, and/or a KNN algorithm.

In some embodiments, and referring to FIG. 7, at step 712, at least one processor is configured to determine whether the performance review rating is below at third threshold. The employer and/or manager may set the third threshold. The processor may store the third threshold in memory (such as, for example, memory 404), as described elsewhere in this disclosure. In one example, the second threshold may be a performance rating of 2, on a scale from 1 to 5. A low performance rating may indicate that the performance evaluation requires additional review. Flagging performance evaluations with low performance ratings may help identify both employees and managers that may need additional coaching.

In some embodiments, and referring to FIG. 7, at step 714, at least one processor is configured to, responsive to a determination that the cosine similarity exceeds the first threshold, the number of words in the second performance review is below the second threshold, or the performance review rating is below the third threshold, set a flag indicating that the second performance evaluation requires further review. The processor may set a flag as described elsewhere in this disclosure. In one example, the processor may determine that a particular performance evaluation may not exceed the first threshold, but the number of words in the second performance review is below the second threshold. The processor may be configured to flag that performance review for further inspection, based on the low number of words in the performance review.

In some embodiments, at least one processor is configured to iterate the processing, determining, and flag setting steps for each of a plurality of second performance evaluations retrieved from the second source, until the second source no longer contains any second performance evaluations to process. For example, the processor may detect that the second source (such as, for example, second source 412) contains 10 newly submitted performance evaluations, that is, 10 performance evaluations that one or more managers submitted over the most recent review period, wherein the review period may be 3 months, 6 months, or a year. Here, the processor may be configured to perform the above processing, determining, and flag setting steps for each of the 10 recently submitted performance evaluations. In this example, the processor may flag two recently submitted performance evaluations for further inspection.

In one example, at least one processor may be configured to provide for display, on a graphical user interface, a number of set flags. Referring to FIG. 4, computing device 400 may contain a graphical user interface (GUI) 418. In one example, the processor may set two flags out of a batch of 10 recently submitted performance evaluations. The processor may be configured to provide for display number of set flags on a GUI, such as, for example, GUI 418, so the employer and/or manager has an idea of which managers may need additional coaching.

Figure 8:
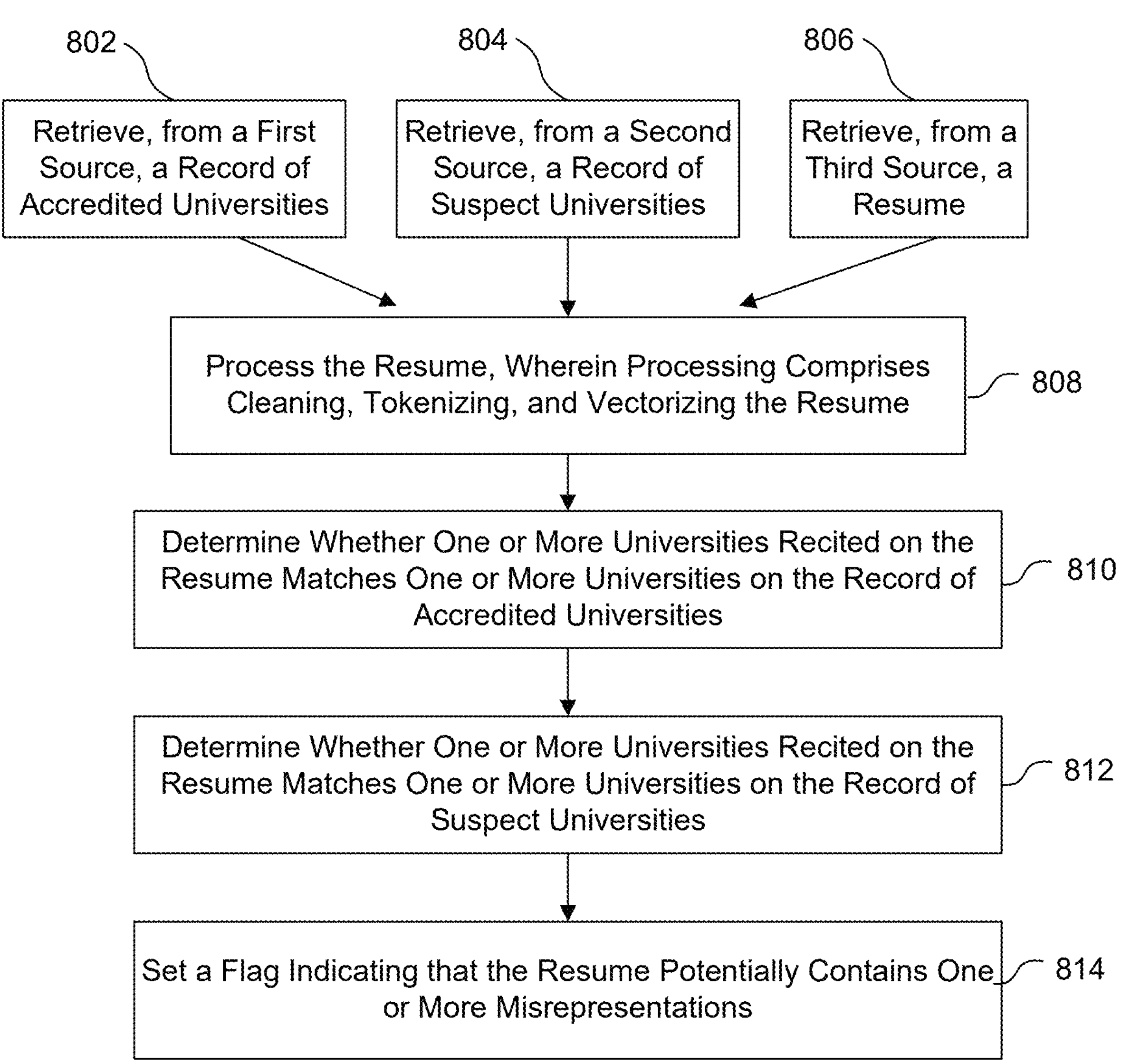
FIG. 8 is a flowchart illustrating an exemplary method for identifying suspicious universities recited on resumes, consistent with disclosed embodiments.

By way of example, FIG. 8 is a flowchart illustrating an exemplary method for identifying suspicious universities recited on resumes, consistent with disclosed embodiments. Suspicious universities may refer to institutions that operate for profit, wherein individuals can purchase degrees without performing the rigorous work associated with higher education at a university. The institutions may be referred to as diploma mills, and may have names that sound legitimate, such as "Redding University," or "Shaftesbury University," but are not legitimate. Operations described in reference to FIG. 8 may be performed by a processor, such as, for example, processor 402 described in reference to FIG. 4.

In some embodiments, and referring to FIG. 8, at step 802, at least one processor is configured to retrieve, from a first source (such as, for example, first source 408), a record of accredited universities. The record or accredited universities may be in the form of a list. The record of accredited universities may be stored within at least one memory associated with first source 408. In another example, the first source may be associated with a cloud server. The record of accredited universities may include all accredited colleges and universities in the United States and/or the world.

In some embodiments, and referring to FIG. 8, at step 804, at least one processor is configured to retrieve, from a second source, a record of suspect universities. As described elsewhere in this disclosure, the record of suspect universities may be in the form of a list. In one example, the second source may be second source 412. The record of suspect universities may be stored within at least one memory associated with second source 412. In another example, the second source may be associated with a cloud server. The record of suspect universities may include a list of known diploma mills.

In some embodiments, and referring to FIG. 8, at step 806, at least one processor (such as, for example, processor 402 as described in reference to FIG. 4) is configured to retrieve, from a third source, a resume. In one example, the resume may be the second document stored on second source 412. In this example, the third source may be the same as second source 412. In another example, the third source may be a cloud-based server. In this example, the cloud-based server may be configured to store newly submitted resumes.

In some embodiments, and referring to FIG. 8, at step 808, at least one processor is configured to process the resume, wherein processing comprises cleaning, tokenizing, and vectorizing the resume, as described in reference to FIG. 5.

In some embodiments, and referring to FIG. 8, at step 810, at least one processor is configured to determine whether one or more universities recited on the resume matches one or more universities on the record of accredited universities. The processor may perform the determination by analyzing the data associated with the resume and comparing it with the record of accredited universities. Consistent with disclosed embodiments, the at least one processor may analyze the resume using a look up table, natural language processing, optical character recognition (OCR), an ANN algorithm, and/or a KNN algorithm. Consistent with disclosed embodiments, the at least one processor may vectorize the resume after analyzing it.

In one example, at least one processor may determine that an applicant recites the "University of Maryland" on their resume. The at least one processor may determine that the University of Maryland is on the record of accredited universities and may therefore not flag the applicant's resume for further review. In another example, an applicant may recite "Shaftesbury University" on their resume. The processor, after performing the look up, may determine that Shaftesbury University is not on the record of accredited universities, and may flag that applicant's resume for further processing. The processor may set a flag as described elsewhere in this disclosure.

In some embodiments, and referring to FIG. 8, at step 812, at least one processor is configured to determine whether one or more universities recited on the resume matches one or more universities on the record of suspect universities. Consistent with disclosed embodiments, the processor may perform the determining step by analyzing the resume using natural language processing, optical character recognition, an ANN algorithm, and/or a KNN algorithm. For example, the processor may determine that an applicant recites the "University of Maryland" on their resume. The processor may determine, using methods described elsewhere in this disclosure, that the University of Maryland is not on the record of suspect universities. In this example, the processor may not flag the instant resume for further review. In another example, an applicant may recite "Suffield University," on their resume. In this example, at least one processor may determine, using a look up table and/or other methods described in this disclosure, that Suffield University is on the record of suspect universities, and the processor may flag the applicant's resume for further inspection. The presence of a university on neither the record of accredited universities nor the record of suspect universities may prompt further investigation into the legitimacy of the university.

In some embodiments, and referring to FIG. 8, at step 814, at least one processor is configured to, responsive to a determination that one or more universities recited on the resume does not match one or more universities on the record of accredited universities, or that one or more universities recited on the resume matches one or more universities on the record of suspect universities, set a flag indicating that the resume potentially contains one or more misrepresentations. The processor may set a flag as described elsewhere in this disclosure.

In one example, an applicant may recite the "University of Maryland" on their resume. In this example, the processor may determine, using a look up table, comparing the analyzed text data from the resume to the record of accredited universities, or any other method described in this disclosure, that the University of Maryland matches one or more universities on the record of accredited universities, and will not set a flag. In another example, the applicant may recite "Suffield University" on their resume. Here, the processor may determine that Suffield University matches one or more universities on the record of suspect universities and may set a flag indicating that the resume potentially contains one or more misrepresentations.

In some embodiments, at least one processor (such as, for example, processor 402 as described in reference to FIG. 4) is further configured to iterate the processing, determining, and flag setting steps for each of the plurality of resumes retrieved from the third source, until the third source no longer contains any resumes to process.

For example, at least one processor may detect that the third source contains 50 resumes. Here, the processor may be configured to perform the above processing, determining, and flag setting steps for each of the 50 resumes. In this example, the processor may flag 4 resumes for further manual inspection, based on one or more universities the applicant recites on their resume.

In one example, at least one processor may be configured to provide for display, on a graphical user interface, a number of set flags. Referring to FIG. 4, computing device 400 may contain a graphical user interface (GUI) 418. In one example, at least one processor may set 4 flags out of a batch of 50 resumes retrieved from the third source. The processor may be configured to provide for display a number of set flags on a GUI, such as, for example, GUI 418, such that the employer may manually inspect the resumes and determine whether one or more resumes recites a suspect university.

Figure 9:
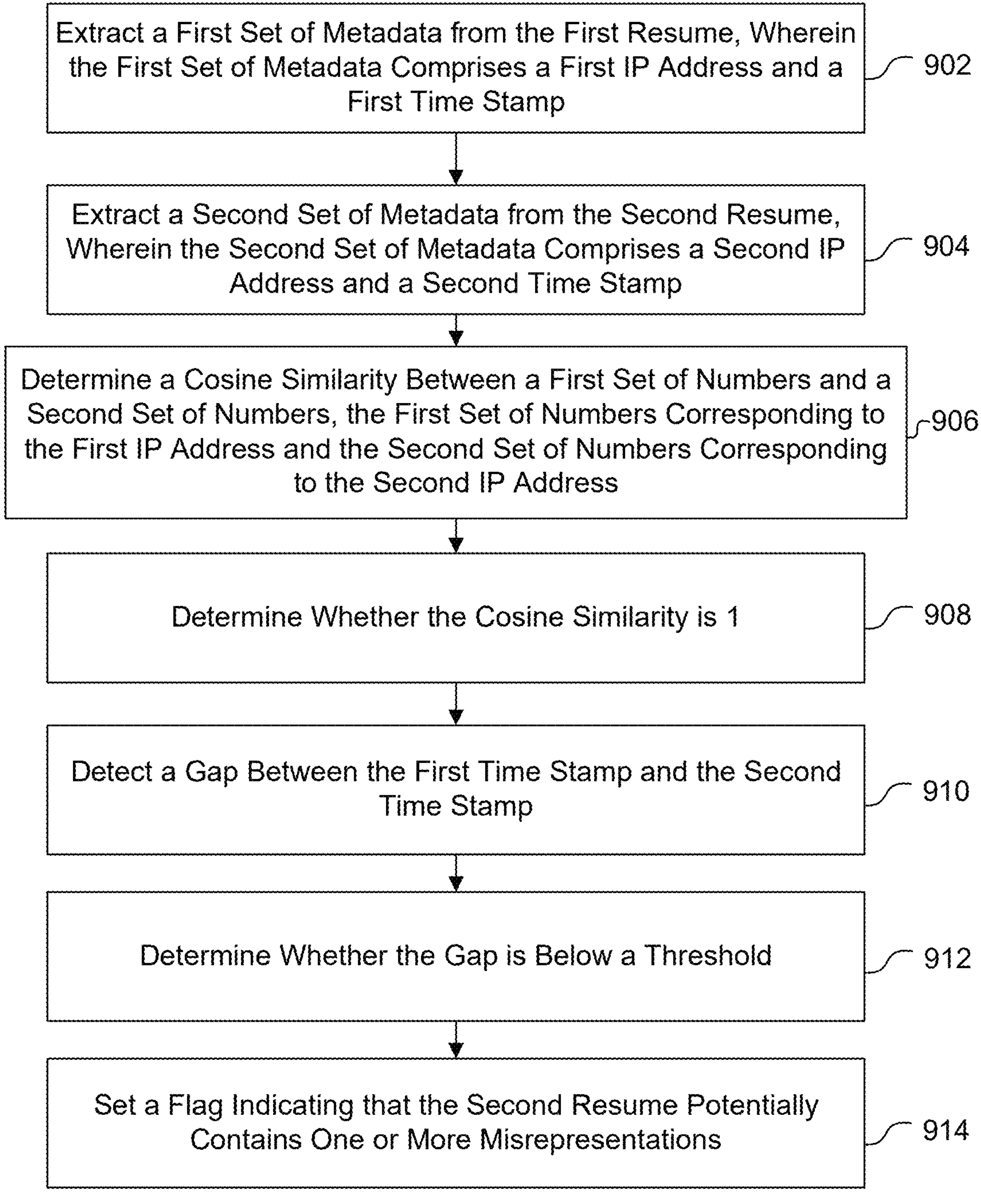
FIG. 9 is a flowchart illustrating an exemplary method for identifying resumes that potentially contain one or more misrepresentations based on the applicant's IP address, consistent with disclosed embodiments.

By way of example, FIG. 9 is a flowchart illustrating an exemplary method 900 for identifying resumes that potentially contain one or more misrepresentations based on the applicant's IP address, consistent with disclosed embodiments. FIG. 9 may represent exemplary operations that may be performed at step 524, described in reference to FIG. 5. The operations may be performed by a processor, such as, for example, processor 402 described in reference to FIG. 4. In this example, each of the first and second documents is a resume.

In some embodiments, and referring to FIG. 9, at step 902, at least one processor is configured to extract a first set of metadata from the first resume, wherein the first set of metadata comprises a first IP address from which the first resume was submitted and a first timestamp from when the first resume was submitted. In one example, at least one processor may be configured to extract an IP address from a first document (such as, for example, first document 410 described in reference to FIG. 4), here, a resume. In one example, the first resume was submitted within the past 24 hours, the past week, or the past month. The processor may extract the IP address by analyzing the metadata associated with the first resume. The processor may also extract the timestamp from when the first resume was submitted. The processor may be configured to identify and locate the timestamp information by analyzing metadata associated with the first resume.

In some embodiments, and referring to FIG. 9, at step 904, at least one processor is configured to extract a second set of metadata from the second resume, wherein the second set of metadata comprises a second IP address from which the second resume was submitted and a second timestamp from when the second resume was submitted. In this example, the processor may extract metadata from a second document (such as, for example, second document 414 described in reference to FIG. 4), here, a second resume, wherein the second resume is a newly submitted resume. In this example, the second resume may have been submitted within the most recent 24-hour, week, or month period. The processor may identify and locate the second resume's IP address by analyzing metadata associated with the second resume. The processor may similarly determine the timestamp by analyzing metadata associated with the second resume.

In some embodiments, and referring to FIG. 9, at step 906, at least one processor is configured to determine a cosine similarity between a first set of numbers and a second set of numbers, the first set of numbers corresponding to the first IP address and the second set of numbers corresponding to the second IP address. In one example, the first IP address and the second IP address contain the same number of digits. Typically, IP addresses contain four sets of numbers ranging from 0 to 255 (for IPv4) or 128 bits, represented in hexadecimal (for IPv6). The processor may be configured to analyze each set of numbers to determine a cosine similarity between the first and second IP addresses.

In some embodiments, and referring to FIG. 9, at step 908, at least one processor is configured to determine whether the cosine similarity is 1. Unlike documents such as resumes or performance evaluations, a single digit different in an IP address means that the two IP addresses are different. For example, an IP address that reads 25.50.100.200, may be fundamentally different from an IP address that reads 25.50.100.201. Accordingly, for some IP addresses, only a cosine similarly of 1 indicates that the first and second IP addresses are the same. The cosine similarity calculation may be modified to treat differences in numbers at the beginning of IP addresses as more different than those at the end of IP addresses.

In some embodiments, and referring to FIG. 9, at step 910, at least one processor is configured to detect a gap between the first timestamp and the second timestamp. Here, a first timestamp may refer to the time at which an applicant submitted the first resume, and the second timestamp may refer to the time at which an applicant submitted the second resume. The gap may refer to the length of time between when the first resume was submitted and when the second resume was submitted. For example, at least one processor may determine that the first resume was submitted on May 1, 2023, at 2:54 PM. At least one processor may determine that the second resume was submitted on May 9, 2023, at 3:00 PM. The processor may thus determine the gap in time based on the timestamp associated with each resume submission.

In some embodiments, and referring to FIG. 9, at step 912, at least one processor is configured to determine whether the gap is below a threshold. In this example, a short gap in time being the first resume and second resume being submitted to a job portal may indicate that a bad actor is submitting a burst of resumes to flood the applicant pool. An employer may set the threshold, which may be stored in a memory (such as, for example, memory 404 described in reference to FIG. 4) as described elsewhere in this disclosure. In this example, the threshold may be one hour, 12 hours, 24 hours, 3 days, or 1 week. An employer may adjust the threshold higher or lower to potentially capture additional bad actors. The processor may also be configured to determine whether the applicant, even if the IP address between the first and second documents is the same, is applying to different jobs, i.e., the applicant is not a bad actor. The processor may be configured to identify and locate the job information by using a look up table, and/or analyzing the data associated with the first and second documents.

In one example, an employer may set a threshold at two days. In this example, at least one processor may be configured to flag any resume that is submitted within two days of the first resume. The processor may determine that an applicant submitted a first resume to a job portal on May 1, 2023, at 1:00 PM. The processor may determine that an applicant submitted a second resume to the job portal on May 5, 2023, at 2:00 PM. In this example, the second resume does not exceed the threshold. However, the processor may still flag the second resume for further review if, for example, the IP addresses between the first resume and the second resume are the same.

In some embodiments, and referring to FIG. 9, at step 914, at least one processor is configured to, responsive to a determination that the cosine similarity is 1 or the gap in the timestamps is below the threshold, set a flag indicating that the second resume potentially contains one or more misrepresentations. At least one processor may store the set flag information in memory (such as, for example, memory 404 described in reference to FIG. 4). For example, the processor may determine that the IP addresses between the first and second resumes is the same, but the gap between the first timestamp and the second timestamp does not exceed the threshold. In this example, the processor may still flag the second resume for further inspection.

In some embodiments, at least one processor is configured to iterate the processing, extracting, determining, and setting steps for each of a plurality of second resumes retrieved from the second source, until the second source no longer contains any second resumes to process. For example, at least one processor may detect that the second source contains 50 newly submitted resumes, that is, 50 resumes that applicants submitted over a most recent 24-hour period. Here, the processor may be configured to perform the above processing, extracting, determining, and flag setting steps for each of the 50 newly submitted resumes. In this example, the processor may flag 4 newly submitted resumes for further review, responsive to a determination that the IP addresses between the first and second resumes are the same or the gap between the first timestamp and the second time is below the threshold.

Figure 10A:
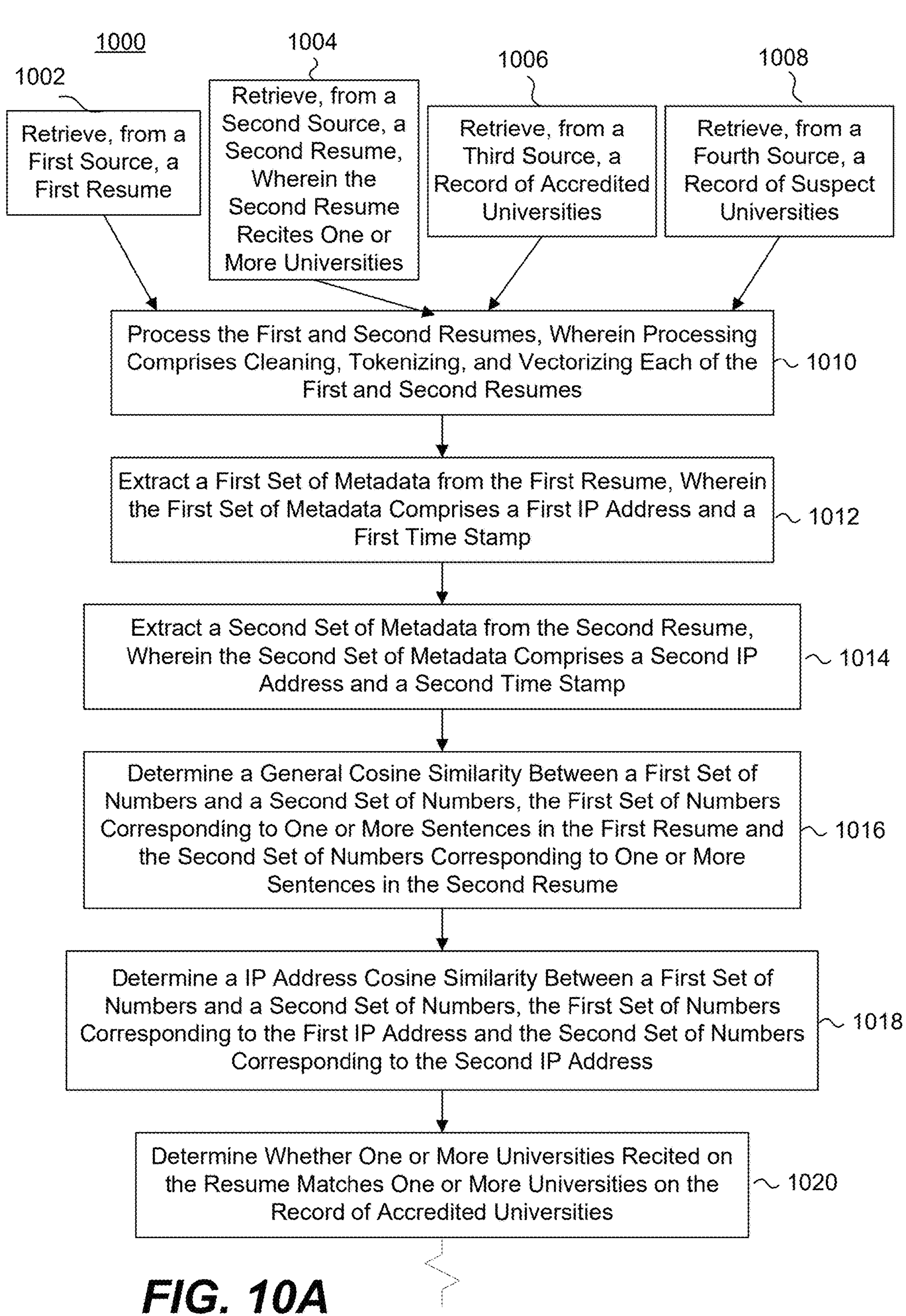
FIG. 10A is a flowchart illustrating an exemplary method for identifying resumes that potentially contain one or more misrepresentations, consistent with disclosed embodiments.

By way of example, FIG. 10A is a flowchart illustrating an exemplary method for identifying resumes that potentially contain one or more misrepresentations, consistent with disclosed embodiments. The operations described in reference to FIG. 10A may be performed by a processor, such as, for example, processor 402 described in reference to FIG. 4.

In some embodiments, and referring to FIG. 10A, at step 1002, at least one processor (such as, for example, processor 402) is configured to retrieve, from a first source, a first resume. In this example, the first source may be first source 408, or the first source may be a cloud-based server. The first document (such as, for example, first document 410 described in reference to FIG. 4) stored on the first source may be the first resume.

In some embodiments, and referring to FIG. 10A, at step 1004, at least one processor is configured to retrieve, from a second source, a second resume, wherein the second resume recites one or more universities. In this example, the second source may be second source 412 or a cloud-based server. The second resume may be a second document (such as, for example, second document 414 as described in reference to FIG. 4). The processor may be configured to determine whether the second resume recites one or more universities by identifying and locating the relevant information using a look up table, optical character recognition, natural language processing, an ANN algorithm, a KNN algorithm, and/or any other method described elsewhere in this disclosure.

In some embodiments, and referring to FIG. 10A, at step 1006, at least one processor is configured to retrieve, from a third source, a record of accredited universities. Consistent with disclosed embodiments, the record of accredited universities may be stored within at least one memory (such as, for example, memory 404 associated with computing device 400 as described in reference to FIG. 4) and/or the memory associated with the first source (such as, for example, first source 408). The record of accredited universities may also be stored on a cloud-based server.

In some embodiments, and referring to FIG. 10A, at step 1008, at least one processor is configured to retrieve, from a fourth source, a record of suspect universities. Consistent with disclosed embodiments, the record of suspect universities may be stored within at least one memory (such as, for example, memory 404 associated with computing device 400 as described in reference to FIG. 4) and/or the memory associated with the second source (such as, for example, second source 412). The record of suspect universities may also be stored on a cloud-based server. The list of suspect universities may include a record of known diploma mills.

In some embodiments, and referring to FIG. 10A, at least one processor is configured to process the first and second resumes at step 1010, wherein processing comprises cleaning, tokenizing, and vectorizing each of the first and second resumes.

In some embodiments, and referring to FIG. 10A, at least one processor is configured to extract a first set of metadata from the first resume at step 1012, wherein the first set of metadata comprises a first IP address and a first timestamp from when the first resume was submitted.

In some embodiments, and referring to FIG. 10A, at step 1014, at least one processor is configured to extract a second set of metadata from the second resume, wherein the second set of metadata comprises a second IP address and a second timestamp from when the second resume was submitted. The processor may extract the second set of metadata as described elsewhere in this disclosure.

In some embodiments, and referring to FIG. 10A, at step 1016, at least one processor is configured to determine a general cosine similarity between a first set of numbers and a second set of numbers, the first set of numbers corresponding to one or more sentences in the first resume and the second set of numbers corresponding to one or more sentences in the second resume. The processor may be configured to determine a cosine similarity between multiple sets of numbers. In this example, the general cosine similarity generally refers to text extracted from each of the first and second resumes and does not include metadata information such as an IP address associated with the first and second resumes.

In some embodiments, and referring to FIG. 10A, at step 1018, at least one processor is configured to determine an IP address cosine similarity between a first set of numbers and a second set of numbers, the first set of numbers corresponding to the first IP address and the second set of numbers corresponding to the second IP address. In this example, the IP address cosine similarity differs from the general cosine similarity because the IP address cosine similarity is solely based on extracting and analyzing the IP address information between the first resume and the second resume.

In some embodiments, and referring to FIG. 10A, at step 1020, at least one processor is configured to determine whether one or more universities recited on the resume matches one or more universities on the record of accredited universities. The processor may perform this determining step as described elsewhere in this disclosure.

Figure 10B:
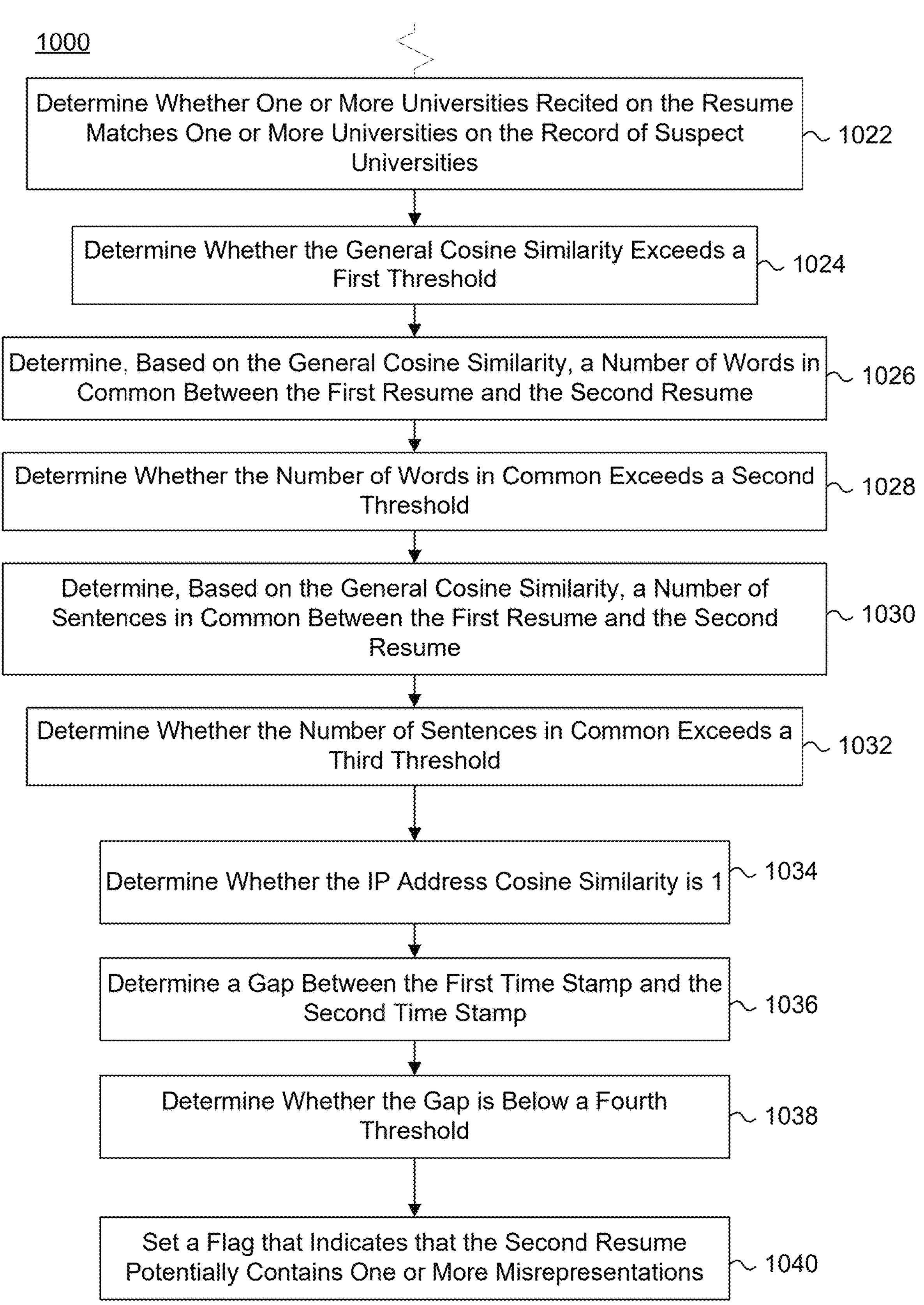
FIG. 10B is a flowchart illustrating an exemplary method for identifying resumes that potentially contain one or more misrepresentations, consistent with disclosed embodiments.

By way of example, FIG. 10B is a flowchart illustrating an exemplary method for identifying resumes that potentially contain one or more misrepresentations, consistent with disclosed embodiments. The operations described in reference to FIG. 10B may be performed by at least one processor, such as, for example, processor 402 described in reference to FIG. 4.

In some embodiments, and referring to FIG. 10B, at step 1022, at least one processor is configured to determine whether one or more universities recited on the resume matches one or more universities on the record of suspect universities. The processor may perform this determining step as described elsewhere in this disclosure.

In some embodiments, and referring to FIG. 10B, at step 1024, at least one processor is configured to determine whether the general cosine similarity exceeds a first threshold. The processor may be configured to store the first threshold in a memory (such as, for example, memory 404), as described elsewhere in this disclosure. An employer and/or manager may set the first threshold based on preference, and may adjust the threshold higher or lower depending on how many second resumes the employer wants to capture. In one example, the general cosine similarity may be a range, for example, from 0.5 to 1. In another example, the general cosine similarity may be a single number, such as 0.7, 0.8, or 0.9.

In some embodiments, and referring to FIG. 10B, at step 1026, at least one processor is configured to determine, based on the general cosine similarity, a number of words in common between the first resume and the second resume. The processor may perform this determining step as discussed elsewhere in this disclosure.

In some embodiments, and referring to FIG. 10B, at step 1028, at least one processor is configured to determine whether the number of words in common exceeds a second threshold. The second threshold may refer to the maximum permissible number of words in common between the first document and the second document. The processor may be configured to store the second threshold in a memory (such as, for example, memory 404), as described elsewhere in this disclosure. In one example, the processor may determine that the first and second document contain 40 words in common. In another example, at least one processor may determine that the first and second documents contain 120 words in common. The processor may set the second threshold at 100 words, wherein the second threshold may be configured by the employer, manager, or other end user.

In some embodiments, and referring to FIG. 10B, at step 1030, at least one processor is configured to determine, based on the general cosine similarity, a number of sentences in common between the first resume and the second resume.

In some embodiments, and referring to FIG. 10B, at step 1032, at least one processor is configured to determine whether the number of sentences in common exceeds a third threshold. The third threshold may refer to the maximum permissible number of sentences in common between the first and second resume before the processor flags the second resume for further inspection. The processor may be configured to store the third threshold in a memory (such as, for example, memory 404), as described elsewhere in this disclosure. The third threshold may be a range of numbers, or the third threshold may be a single number. For example, the third threshold may be between 5 and 10, or the third threshold may be 6.

In some embodiments, and referring to FIG. 10B, at step 1034, at least one processor is configured to determine whether the IP address cosine similarity is 1. As described herein, IP addresses that differ by a single digit may nevertheless be completely different from one another. Accordingly, the processor may be configured to only flag a second resume for further inspection if the IP address cosine similarity is 1. In this example, the processor may not set a flag if the IP address cosine similarity is 0.9, or even 0.95.

In some embodiments, and referring to FIG. 10B, at step 1036, at least one processor is configured to determine a gap between the first timestamp and the second timestamp. The processor may perform this determining step as discussed elsewhere in this disclosure.

In some embodiments, and referring to FIG. 10B, at step 1038, at least one processor is configured to determine whether the gap is below a fourth threshold. The fourth threshold may refer to a minimum permissible length of time from when the first resume is submitted and when the second resume is submitted. For example, the fourth threshold may be an hour, one day, two days, or week. The processor may be configured to store the first threshold in a memory (such as, for example, memory 404), as described elsewhere in this disclosure. The processor may be configured to adjust the fourth threshold based on user input. For example, the lower the fourth threshold, the fewer second resumes may be flagged, and vice versa.

In some embodiments, and referring to FIG. 10B, at least one processor is configured to, responsive to a determination that: the general cosine similarity exceeds the first threshold, the number of words in common exceeds the second threshold, the number of sentences in common exceeds the third threshold, the IP address cosine similarity is 1, one or more of the universities recited on the second resume does not match one or more universities on the record of accredited universities, one or more of the universities recited on the second resume matches one or more universities listed on the record of suspect universities, or the gap is below the fourth threshold, at step 1040, set a flag that indicates that the second resume potentially contains one or more misrepresentations. In one example, the general cosine similarity may exceed the first threshold, but may not trigger any of the remaining threshold criteria. The processor may nevertheless flag the second resume for further inspection, as described elsewhere in this disclosure. In another example, the processor may determine that a university recited on an applicant's resume does not match one or more resumes on the record of accredited universities by analyzing, using natural language processing, the texts on applicant's resume. Here, the processor may still set a flag, indicating that further inspection of the second resume is required.

In some embodiments, the processor is further configured to iterate the processing, extracting, determining, and flag setting steps for each of a plurality of second resumes retrieved from the second source, until the second source no longer contains any second resumes to process. For example, at least one processor may detect that the second source contains 50 newly submitted resumes, that is, 50 resumes that applicants submitted over a most recent 24-hour period. Here, the processor may be configured to perform the above processing, determining, and flag setting steps for each of the 50 newly submitted resumes. In this example, the processor may flag 4 newly submitted resumes for further review, based on any one of first, second, third, or fourth thresholds, as well as a determination that the IP address cosine similarity is 1. Consistent with disclosed embodiments, the may be configured to provide the number of set flags for display on a GUI, such as, for example, GUI 418.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system comprising:

a memory storing instructions; and at least one processor configured to execute the stored instructions to:

retrieve, via a network, from a first source from a first source comprising a repository of previously submitted documents, a first document;

retrieve, via the network, from a second source distinct from the first source and comprising a repository of newly submitted documents, a second document;

process the first document and the second document, wherein processing comprises:

cleaning each of the first document and the second document by removing personally identifiable metadata and hazardous hidden content comprising malicious scripts or malware, tokenizing each of the first document and the second document by substituting sensitive data elements with non-sensitive tokens, removing stop words, and vectorizing each of the first document and the second document into numeric representations comprising sentence-level vectors and word vectors;

align sentences between the first document and the second document based on cosine similarity between the sentence-level vectors generated during vectorizing, and, within aligned sentence pairs:

determine, based on the cosine similarity, a number W of words in common, and determine a number C of sentences in common equal to a count of aligned sentence pairs whose pairwise cosine similarity exceeds a sentence-pair threshold stored in the memory;

determine a cosine similarity S between a first set of numbers and a second set of numbers, the first set of numbers corresponding to one or more sentences in the first document and the second set of numbers corresponding to one or more sentences in the second document, wherein each number in the first set of numbers corresponds to a word in the first document and each number in the second set of numbers corresponds to a word in the second document;

determine whether the cosine similarity exceeds a first threshold stored in the memory;

determine, based on the cosine similarity and the sentence alignment, a number of words in common between the first document and the second document equal to W;

determine whether the number of words W in common exceeds a second threshold stored in the memory;

determine, based on the cosine similarity and the sentence alignment, a number of sentences in common between the first document and the second document equal to C;

determine whether the number of sentences in common C exceeds a third threshold stored in the memory; and responsive to a determination that the cosine similarity S exceeds the first threshold, and at least one of: the number of words W in common exceeds the second threshold, or the number of sentences in common C exceeds the third threshold:

persistently write, to a record associated with the second document in a vector repository, a duplicate flag field stored as at least one bit that indicates that the second document is a duplicate.

2. The system of claim 1, wherein the at least one processor is further configured to:

iterate the processing, determining, and flag writing steps for each of a plurality of documents retrieved from the second source, until the second source no longer contains any documents to process.

3. The system of claim 2, wherein the at least one processor is further configured to provide for display, on a graphical user interface, a number of duplicate flags.

4. The system of claim 1, wherein the first source includes a repository of previously submitted documents.

5. The system of claim 1, wherein the second source includes a repository of newly submitted documents.

6. The system of claim 1, wherein processing further includes extracting and storing text and metadata on a distributed computer network.

7. The system of claim 6, wherein the at least one processor is further configured to extract text and metadata using at least one of:

natural language processing;

optical character recognition;

a k-nearest neighbors (KNN) algorithm; or an Artificial Neural Network (ANN) algorithm.

8. The system of claim 1, wherein the at least one processor is further configured to load one or more batches of processed first documents into a vector repository.

9. The system of claim 1, wherein the first threshold is between 0.5 and 1.

10. The system of claim 9, wherein the first threshold is 0.85.

11. The system of claim 1, wherein the second threshold is between 50 and 150.

12. The system of claim 11, wherein the second threshold is 100.

13. The system of claim 1, wherein the third threshold is between 5 and 10.

14. The system of claim 13, wherein the third threshold is 6.

15. The system of claim 1, wherein cleaning further includes:

removing malicious scripts;

removing personal identifying information; or removing malware from the first document and the second document.

16. The system of claim 1, wherein tokenizing further includes substituting a sensitive data element with a non-sensitive data element using at least one of: word tokenization, character tokenization, or subword tokenization.

17. A method comprising:

retrieving, via a network, from a first source from a first source comprising a repository of previously submitted documents, a first document;

retrieving, via the network, from a second source distinct from the first source and comprising a repository of newly submitted documents, a second document;

processing the first document and the second document, wherein processing comprises:

cleaning each of the first document and the second document by removing personally identifiable metadata and hazardous hidden content comprising malicious scripts or malware, tokenizing each of the first document and the second document by substituting sensitive data elements with non-sensitive tokens, removing stop words, and vectorizing each of the first document and the second document into numeric representations comprising sentence-level vectors and word vectors;

align sentences between the first document and the second document based on cosine similarity between the sentence-level vectors generated during vectorizing, and, within aligned sentence pairs:

determine, based on the cosine similarity, a number W of words in common, and determine a number C of sentences in common equal to a count of aligned sentence pairs whose pairwise cosine similarity exceeds a sentence-pair threshold stored in the memory;

determining a cosine similarity S between a first set of numbers and a second set of numbers, the first set of numbers corresponding to one or more sentences in the first document and the second set of numbers corresponding to one or more sentences in the second document, wherein each number in the first set of numbers corresponds to a word in the first document and each number in the second set of numbers corresponds to a word in the second document;

determining whether the cosine similarity exceeds a first threshold stored in the memory;

determining, based on the cosine similarity and the sentence alignment, a number of words in common between the first document and the second document equal to W;

determining whether the number of words W in common exceeds a second threshold stored in the memory;

determining, based on the cosine similarity and the sentence alignment, a number of sentences in common between the first document and the second document equal to C;

determining whether the number of sentences in common C exceeds a third threshold stored in the memory; and responsive to a determination that the cosine similarity exceeds S the first threshold, and at least one of: the number of words in common W exceeds the second threshold, or the number of sentences in common C exceeds the third threshold:

persistently write, to a record associated with the second document in a vector repository, a duplicate flag field stored as at least one bit that indicates that the second document is a duplicate.

18. The method of claim 17, further including iterating the processing, determining, and flag writing steps for each of a plurality of documents retrieved from the second source, until the second source no longer contains any documents to process.

19. A non-transitory computer readable medium having stored instructions, which when executed, cause at least one processor to perform instructions comprising:

retrieving, via a network, from a first source from a first source comprising a repository of previously submitted documents, a first document;

retrieving, via the network, from a second source distinct from the first source and comprising a repository of newly submitted documents, a second document;

processing the first document and the second document, wherein processing comprises:

cleaning each of the first document and the second document by removing personally identifiable metadata and hazardous hidden content comprising malicious scripts or malware, tokenizing each of the first document and the second document by substituting sensitive data elements with non-sensitive tokens, removing stop words, and vectorizing each of the first document and the second document into numeric representations comprising sentence-level vectors and word vectors;

align sentences between the first document and the second document based on cosine similarity between the sentence-level vectors generated during vectorizing, and, within aligned sentence pairs:

determine, based on the cosine similarity, a number W of words in common, and determine a number C of sentences in common equal to a count of aligned sentence pairs whose pairwise cosine similarity exceeds a sentence-pair threshold stored in the memory;

determining a cosine similarity S between a first set of numbers and a second set of numbers, the first set of numbers corresponding to one or more sentences in the first document and the second set of numbers corresponding to one or more sentences in the second document, wherein each number in the first set of numbers corresponds to a word in the first document and each number in the second set of numbers corresponds to a word in the second document;

determining whether the cosine similarity exceeds a first threshold stored in the memory;

determining, based on the cosine similarity and the sentence alignment, a number of words in common between the first document and the second document equal to W;

determining whether the number of words W in common exceeds a second threshold stored in the memory;

determining, based on the cosine similarity and the sentence alignment, a number of sentences in common between the first document and the second document equal to C;

determining whether the number of sentences in common C exceeds a third threshold stored in the memory; and responsive to a determination that the cosine similarity exceeds S the first threshold, and at least one of: the number of words in common W exceeds the second threshold, or the number of sentences in common C exceeds the third threshold:

persistently write, to a record associated with the second document in a vector repository, a duplicate flag field stored as at least one bit that indicates that the second document is a duplicate.

20. The non-transitory computer readable medium of claim 19, wherein the at least one processor is further configured to:

iterate the processing, determining, and flag writing steps for each of a plurality of documents retrieved from the second source, until the second source no longer contains any documents to process.

* * * * *